(12) United States Patent
Yamada et al.

(10) Patent No.: US 11,601,254 B2
(45) Date of Patent: Mar. 7, 2023

(54) COMMUNICATION APPARATUS, COMMUNICATIONS SYSTEM, AND COMMUNICATION METHOD

(71) Applicant: Sony Semiconductor Solutions Corporation, Kanagawa (JP)

(72) Inventors: Junya Yamada, Kanagawa (JP); Toshihisa Hyakudai, San Diego, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 10 days.

(21) Appl. No.: 17/469,298

(22) Filed: Sep. 8, 2021

(65) Prior Publication Data

US 2022/0094513 A1 Mar. 24, 2022

Related U.S. Application Data

(60) Provisional application No. 63/080,382, filed on Sep. 18, 2020.

(51) Int. Cl.
*H04L 5/14* (2006.01)
*H04L 43/106* (2022.01)

(52) U.S. Cl.
CPC .............. *H04L 5/14* (2013.01); *H04L 43/106* (2013.01); *H04L 2212/00* (2013.01)

(58) Field of Classification Search
CPC ..... H04L 5/14; H04L 43/106; H04L 2212/00; H04L 43/022; H04L 43/0823
See application file for complete search history.

(56) References Cited

U.S. PATENT DOCUMENTS

| | | | | |
|---|---|---|---|---|
| 10,212,658 B2* | 2/2019 | Pelletier | ............ | H04W 52/0212 |
| 10,789,193 B2* | 9/2020 | Lee | ....................... | G06F 13/4022 |
| 10,855,527 B2* | 12/2020 | Barrenscheen | ......... | H04L 5/005 |
| 10,958,412 B1* | 3/2021 | Barrenscheen | ....... | H04L 5/0044 |
| 2014/0247892 A1* | 9/2014 | Williams | ................. | H04B 3/54 375/257 |
| 2014/0351359 A1* | 11/2014 | Grocutt | ..................... | G06F 1/12 709/209 |
| 2017/0060791 A1* | 3/2017 | Huh | ....................... | G11C 7/1093 |
| 2017/0222686 A1* | 8/2017 | Khan | ....................... | H04L 69/324 |
| 2019/0042049 A1* | 2/2019 | Kumar | ................. | G06F 13/4278 |
| 2019/0385057 A1* | 12/2019 | Litichever | ............... | H04L 63/14 |
| 2020/0212943 A1* | 7/2020 | Banin | ................... | H04L 1/1607 |
| 2022/0094513 A1* | 3/2022 | Yamada | ................. | H04L 43/022 |

* cited by examiner

*Primary Examiner* — Wutchung Chu
(74) *Attorney, Agent, or Firm* — Michael Best & Friedrich LLP

(57) ABSTRACT

A communication apparatus includes: a controller that determines a time stamp as a starting point and a unit period of the time stamp starting from the starting point; an encapsulator that synchronizes, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information; a LINK that generates an Up link packet including the first GPIO packet; and a PHY that transmits a transmission signal to a communication partner apparatus, the transmission signal conforming to a predetermined communication protocol and including the Up link packet.

22 Claims, 19 Drawing Sheets

| pakect | Value | function |
|---|---|---|
| timestampe(S) | 0 | timestamp none |
| | 1 | next data is timestamp |
| GPIO mode(T) | 0XX | full sampling |
| | 1XX | edge sampling |
| | X00 | Config + Data |
| | X01 | Config |
| | X10 | Data |
| | X11 | User define |
| GPIO Pin Info ((U) or (R)) | [7:4] | Pin No |
| | XX00 | Disable |
| | XX01 | In |
| | XX10 | In-float(pullU/pullD) |
| | XX11 | Out |
| Data placement(W) | 00 | 8 time slot |
| | 01 | 4time slot |
| | 10 | 2time slot |
| | 11 | half slot |

FIG.8

(In the case of transmitting only GPIO Header)

| (S) | (T)(U)(R)(V)(W)(X) | (Q) |
|---|---|---|
| t_stamp | GPIO header | CRC |

FIG.9A (In the case of transmitting only sampling data)

| (S) | (Y):Full sampling | (Q) |
|---|---|---|
| t_stamp | data0,data10,data20...,data4990 | CRC |

(Z):Edge sampling
(pos0,data0),(pos2,data2),(pos4,data4)....,(pos499,data499)

FIG.9B (In the case of transmitting GPIO Header and sampling data together)

| (S) | (T)(U)(R)(V)(W)(X) | (Y):Full sampling | (Q) |
|---|---|---|---|
| t_stamp | GPIO header | data0,data10,data20...,data4990 | CRC |

(Z):Edge sampling
(pos0,data0),(pos2,data2),(pos4,data4)....,(pos499,data499)

|  | 1byte | | | | | | | | 2byte | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| 8 time slot | a | a | a | a | a | a | a | a | | | | | | | | |
| 4 time slot | a | b | a | b | a | b | a | b | | | | | | | | |
| 2 time slot | a | b | c | d | a | b | c | d | | | | | | | | |
| 1 time slot | a | b | c | d | e | f | g | h | | | | | | | | |
| half time slot | a | b | c | d | e | f | g | h | i | k | l | m | n | o | p | q |

FIG. 12

|     |     | (S)     | (T)(U)(V)(W)(X) | (Y)                        | (Q) |
|-----|-----|---------|-----------------|----------------------------|-----|
| (4) | (5) | t_stamp | GPIO header     | data0,data10,data20...,data4990 | CRC |

FIG.17

|     |     | (S)     | (T) (R) (V) (X) | (Z)                                              | (Q) |
|-----|-----|---------|-----------------|--------------------------------------------------|-----|
| (4) | (5) | t_stamp | GPIO header    | (pos0,data0),(pos2,data2),(pos4,data4)....,(pos499,data499) | CRC |

FIG.18

| (T) (R) (V) (X) |
|-----------------|
| GPIO header     |

|     |     | (S)     | (T)(U)(V)(W)(X) | (Y)                        | (Q) |
|-----|-----|---------|-----------------|----------------------------|-----|
| (4) | (5) | t_stamp | GPIO header     | data0,data10,data20...,data4990 | CRC |

FIG.19

COMMUNICATION APPARATUS, COMMUNICATIONS SYSTEM, AND COMMUNICATION METHOD

CROSS REFERENCE TO RELATED APPLICATIONS

This application claims the benefit of U.S. Priority Patent Application No. 63/080,382 filed Sep. 18, 2020, the entire contents of which are incorporated herein by reference.

BACKGROUND

The present disclosure relates to a communication apparatus, a communications system, and a communication method.

A technology in which in the case where data communication is performed between a Master and a Slave, serial communication is performed between a SerDes for the Master (hereinafter, referred to as M_SerDes) and a SerDes for the slave (hereinafter, referred to as S_SerDes) is proposed. The serial communication between the two SerDeses is performed by transmission/reception of packets via a predetermined communication protocol.

Meanwhile, for example, GPIO (General Purpose Input/Output) communication is performed between the Master and the M_SerDes and between the Slave and the S_SerDes.

SUMMARY

The M_SerDes that has received data from the Master through GPIO communication samples the received data, converts the sampled data into a packet of a predetermined communication protocol, and transmits the packet to the S_SerDes. However, in the case where the amount of data received through GPIO communication is enormous, the amount of data to be sampled increases when sampling is performed at a fixed period of time.

The signal logic of data received through GPIO communication may rarely change. However, the amount of data after sampling cannot be reduced as long as such data is sampled at a fixed period of time, and the total amount of packets transmitted/received between the M_SerDes and the S_SerDes increases.

In this regard, in the present disclosure, it is possible to provide a communication apparatus, a communications system, and a communication method that are capable of efficiently performing serial communication.

In order to achieve the above-mentioned object, in accordance with the present disclosure, there is provided a communication apparatus including:

a controller that determines a time stamp as a starting point and a unit period of the time stamp starting from the starting point;

an encapsulator that synchronizes, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information;

a LINK that generates an Up link packet including the first GPIO packet; and a PHY that transmits a transmission signal to a communication partner apparatus, the transmission signal conforming to a predetermined communication protocol and including the Up link packet.

The controller may receive, from the Master, GPIO setting information including sampling-mode information for specifying one of a first mode and a second mode, a time stamp, and a sampling period, and the encapsulator may
generate, in the first mode, the first GPIO packet including all pieces of sampling data obtained by sampling first GPIO signals received from the Master in the sampling period starting from the starting point, and
generate, in the second mode, where a value of the sampling data sampled at first sampling timing differs from a value of the sampling data sampled at second sampling timing the sampling period after the first sampling timing, the first GPIO packet including the sampling data sampled at the second sampling timing and first time information indicating the second sampling timing.

The communication apparatus may further include a de-encapsulator that reproduces a second GPIO signal and transmits the second GPIO signal to the Master, in which
the PHY may receive a transmission signal conforming to the predetermined communication protocol from the communication partner apparatus,
the LINK may separate a second GPIO packet from the transmission signal, and
the de-encapsulator may reproduce the second GPIO signal on the basis of the sampling-mode information, the starting point, the sampling period, and the second GPIO packet.

The de-encapsulator may
reproduce, in the first mode in which one or more pieces of sampling data is included in the second GPIO packet, the second GPIO signal by assigning each of the one or more pieces of sampling data included in the second GPIO packet to respective pieces of sampling data sampled every time the sampling period elapses starting from the starting point, and
reproduce, in the second mode in which each of one or more pieces of sampling data is included in the second GPIO packet in association with second time information indicating sampling timing, the second GPIO signal by repeating processing of assigning the sampling data corresponding to the second time information at the sampling timing indicated by the second time information and assigning the same sampling data for each sampling period until the sampling timing corresponding to the next second time information in the second GPIO packet.

The communication apparatus may further include a second timer that outputs time information synchronized with a first timer in the Master,
the de-encapsulator may include a memory for storing the second GPIO signal,
the second GPIO packet may include time stamp information relating to output timing of the second GPIO signal, and
the de-encapsulator may
transmit, where the time stamp information has a first value, the second GPIO signal to the Master without storing the second GPIO signal in the memory,
store, where the time stamp information has a second value, the second GPIO signal in the memory, and
read, where time information of the second timer coincides with time information inserted after the time stamp information in the second GPIO packet, the second GPIO signal from the memory and transmit the read second GPIO signal to the Master.

The controller may perform, before starting GPIO communication with the Master, control of the encapsulator to generate the packet on the basis of the GPIO setting information transmitted from the Master by a communication method different from GPIO communication.

The GPIO setting information may include at least one of sampling frequency information of the GPIO signal, GPIO pin setting information, GPIO configuration information, or data length information of the sampled data.

The encapsulator may generate the first GPIO packet that includes header information including at least one of the sampling-mode information, the sampling frequency information, the GPIO pin setting information, the GPIO configuration information, or the data length information.

The GPIO configuration information may include the number of pins for performing GPIO communication, the GPIO pin setting information, and a time slot for storing GPIO communication information.

The encapsulator may generate, before transmitting a packet including the sampled data to the communication partner apparatus, the first GPIO packet including the header information without including the sampled data.

The encapsulator may generate at least one of the first GPIO packet including the header information without including the sampled data, the first GPIO packet including the header information and the sampled data, or the first GPIO packet including the sampled data without including the header information.

The encapsulator may add at least one of time stamp information or error detection information to the first GPIO packet.

The communication protocol may be a communication protocol of a TDD (Time Division Duplex) communication method, and the unit period may be one frame period of the TDD communication method.

In accordance with the present disclosure, there is a provided a communication apparatus including:

a PHY that receives, from a communication partner apparatus, a transmission signal conforming to a predetermined communication protocol;

a LINK that separates a first GPIO packet including a time control command from the transmission signal;

a controller that determines a starting point on the basis of the time control command; and a de-encapsulator that determines whether sampling-mode information included in header information in the first GPIO packet is a first mode indicating to include all pieces of sampling data obtained by sampling a GPIO (General Purpose Input/Output) signal transmitted from a Master at a constant sampling period or a second mode indicating to include sampling data sampled at a sampling interval corresponding to a frequency of logical changes of the GPIO signal and sampling position information, converts the first GPIO packet into a first GPIO signal, and transmits the obtained first GPIO signal to a Slave.

The de-encapsulator may reproduce, in the first mode in which one or more pieces of sampling data is included in the first GPIO packet, the first GPIO signal by assigning each of the one or more pieces of sampling data included in the first GPIO packet to respective pieces of sampling data sampled every time the sampling period elapses starting from the starting point, and reproduce, in the second mode in which each of one or more pieces of sampling data is included in the first GPIO packet in association with first time information indicating sampling timing, the first GPIO signal by repeating processing of assigning the sampling data corresponding to the first time information at the sampling timing indicated by the first time information and assigning the same sampling data for each sampling period until the sampling timing corresponding to the next first time information in the first GPIO packet.

The communication apparatus may further include a second timer that outputs time information synchronized with a first timer in the Master, in which the de-encapsulator may include a memory for storing the first GPIO signal, the first GPIO packet may include time stamp information relating to output timing of the first GPIO signal, and the de-encapsulator may transmit, where the time stamp information has a first value, the first GPIO signal to the slave without storing the first GPIO signal in the memory, store, where the time stamp information has a second value, the first GPIO signal in the memory, and read, where time information of the second timer coincides with time information inserted after the time stamp information in the first GPIO packet, the first GPIO signal from the memory and transmit the read first GPIO signal to the Slave.

The communication apparatus may further include an encapsulator that generates, starting from a starting point, a second GPIO packet including sampling data obtained by sampling a second GPIO signal from the Slave at one of a constant sampling period and a sampling interval corresponding to a frequency of logical changes of the GPIO signal, and sampling position information.

The encapsulator may generate, in the first mode, the second GPIO packet including all pieces of sampling data obtained by sampling the second GPIO signal received from the Slave in the sampling period starting from the starting point, and generate, in the second mode, where a value of the sampling data sampled at first sampling timing differs from a value of the sampling data sampled at second sampling timing the sampling period after the first sampling timing, the second GPIO packet including the sampling data sampled at the second sampling timing and time information indicating the second sampling timing.

The controller may perform input/output control of a GPIO pin on the basis of GPIO pin setting information transmitted from the Master via the communication partner apparatus before starting GPIO communication with the Slave.

The header information may include at least one of sampling frequency information, GPIO pin setting information, GPIO configuration information, or data length information of the sampled data.

The communication protocol may be a communication protocol of a TDD (Time Division Duplex) communication method.

In accordance with the present disclosure, there is provided a communications system, including:

a Master SerDes and a Slave SerDes that perform serial communication through a predetermined communication protocol, wherein the Master SerDes includes a first controller that determines a time stamp as a starting point and a unit period of the time stamp starting from the starting point, a first encapsulator that synchronizes, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information, a first LINK that generates an Up link packet including the first GPIO packet, and a first PHY that transmits a transmission signal to a communication partner apparatus, the transmission signal conforming to the predetermined communication protocol and including the Up link packet, and the Slave SerDes includes a second PHY that receives, from a communication partner apparatus, a transmission signal conforming to the predetermined communication protocol, a second LINK that separates a second GPIO packet including a time control command from the transmission signal, a second controller that determines a starting point on a basis of the time control command, and a first de-encapsulator that determines whether sampling-mode information included in header information in the second GPIO packet is a first mode indicating to include all pieces of sampling data obtained by sampling a second GPIO signal transmitted from a Master at a constant sampling period or a second mode indicating to include sampling data sampled at a sampling interval corresponding to a frequency of logical changes of the GPIO signal and sampling position information, converts the second GPIO packet into a second GPIO signal, and transmits the obtained second GPIO signal to a Slave.

In accordance with the present disclosure, there is provided a communications method in which a Master SerDes and a Slave SerDes perform serial communication through a predetermined communication protocol, including:

by the Master SerDes, determining a time stamp as a starting point and a unit period of the time stamp starting from the starting point;

synchronizing, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information;

generating an Up link packet including the first GPIO packet; and transmitting a transmission signal to a communication partner apparatus, the transmission signal conforming to the predetermined communication protocol and including the Up link packet; and by the Slave SerDes, receiving, from a communication partner apparatus, a transmission signal conforming to the predetermined communication protocol;

separating a second GPIO packet including a time control command from the transmission signal;

determining a starting point on a basis of the time control command; and determining whether sampling-mode information included in header information in the second GPIO packet is a first mode indicating to include all pieces of sampling data obtained by sampling a second GPIO signal transmitted from a Master at a constant sampling period or a second mode indicating to include sampling data sampled at a sampling interval corresponding to a frequency of logical changes of the GPIO signal and sampling position information, converts the second GPIO packet into a second GPIO signal, and transmitting the obtained second GPIO signal to a Slave.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a diagram showing an example of GPIO header information;

FIG. 9A is a diagram showing a data structure of a packet including only GPIO header information;

FIG. 9B is a diagram showing a data structure of a packet including only sampling data;

FIG. 9C is a diagram showing a data structure of a packet including only GPIO header information and sampling data;

FIG. 10 is a diagram showing details of GPIO header information and data in the case where full sampling is performed;

FIG. 11 is a diagram showing details of GPIO header information and data in the case where edge sampling is performed;

FIG. 12 is a diagram describing details of pin placement;

FIG. 17 is a diagram showing an UP (Down) Link packet transmitted/received by the S_SerDes when full sampling is performed;

FIG. 18 is a diagram showing an UP (Down) Link packet transmitted/received by the S_SerDes when edge sampling is performed;

FIG. 19 is a diagram showing a data structure of a packet input to a de-encapsulator 260;

DETAILED DESCRIPTION OF EMBODIMENTS

An embodiment of a communication apparatus, a communications system, and a communication method will be described below with reference to the drawings. Although main components of a communication apparatus, a communications system, and a communication method will be mainly described below, the communication apparatus, the communications system, and the communication method have components or functions that are not shown or described. The following description does not exclude components or functions that are not shown or described.

Figure 1:
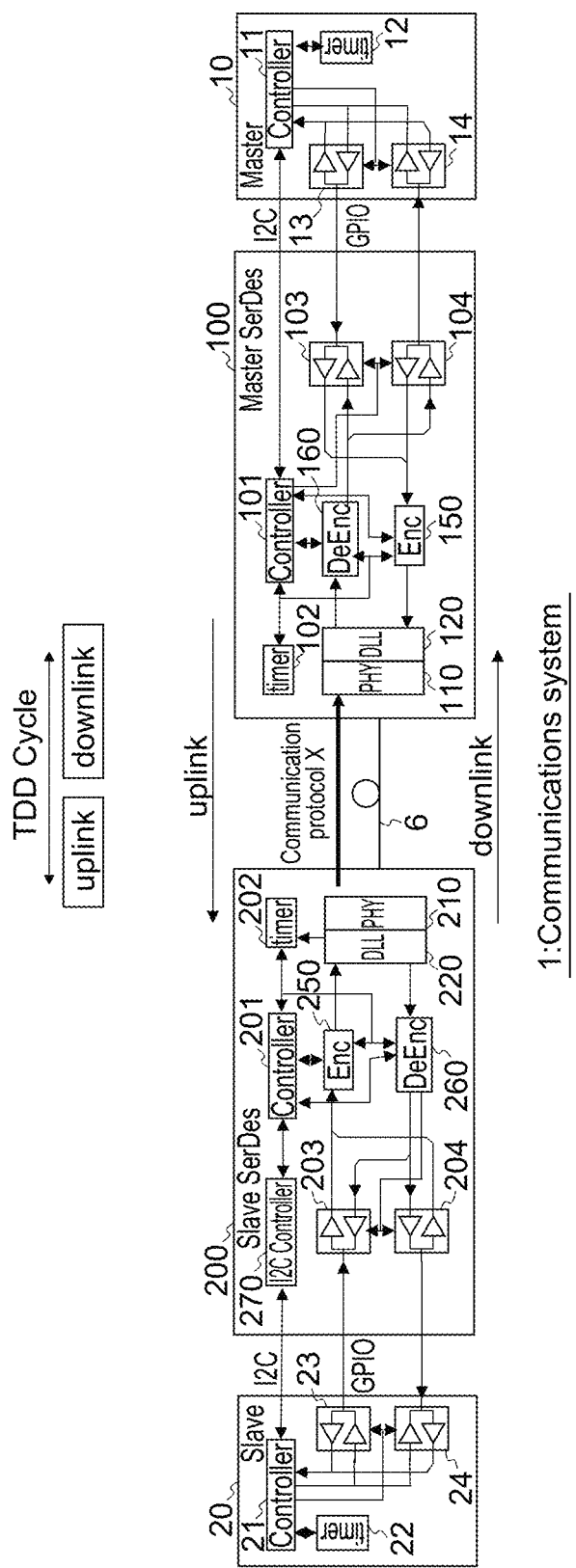
FIG. 1 is a block diagram showing a schematic configuration of a communications system including a communication apparatus according to an embodiment.

FIG. 1 is a block diagram showing a schematic configuration of a communications system including a communication apparatus according to an embodiment. The communications system shown in FIG. 1 is, for example, a camera video recognition system that is a system of part of an ADAS (Advanced Driver Assistance System).

A communications system 1 in FIG. 1 includes a Master 10, a Master SerDes (M_SerDes) 100, a Slave 20, and a Slave SerDes (S_SerDes) 200. Of these, at least one of the M_SerDes 100 and the S_SerDes 200 is a communication apparatus according to an embodiment of the present disclosure.

The M_SerDes 100 and the S_SerDes 200 are connected to each other so as to be capable of communicating with each other through a predetermined communication standard (hereinafter, referred to as "communication standard X"). Examples of the predetermined communication standard X include, but not limited to, FPD-Link III, A-phy, and ASA. Each of the M_SerDes 100 and the S_SerDes 200 corresponds to the communication apparatus according to this embodiment. In this specification, an example in which the M_SerDes 100 and the S_SerDes 200 perform serial signal transmission by a TDD method will be mainly described.

The Master 10 and the M_SerDes 100 are capable of transmitting/receiving a serial signal through at least GPIO (General Purpose Input/Output) communication. Note that the Master 10 and the M_SerDes 100 may have a function of transmitting/receiving a serial signal through I2C (Inter-Integrated Circuit) communication, SPI (Serial Peripheral Interface) communication, or the like in addition to GPIO communication.

In FIG. 1, a signal path on a transmission path (cable) 6 through which serial signal transmission of information from the S_SerDes 200 to the M_SerDes 100 is performed is referred to as a Down Link, a signal path on the transmission path 6 through which serial signal transmission of information from the M_SerDes 100 to the S_SerDes 200 is performed is referred to as an UP Link.

The Master 10 in FIG. 1 includes a controller 11, a timer 12, and input/output buffers 13 and 14 for GPIO communication. In FIG. 1, only the block structure relating to GPIO communication within the Master 10 is illustrated. The Master 10 may have a function other than the GPIO communication, but such a function is omitted in FIG. 1. The controller 11 performs control of generating a GPIO signal to be transmitted to the M_SerDes 100 and transmitting/receiving a GPIO signal via the input/output buffers 13 and 14. As will be described below, the timer 12 is used to time-synchronize the M_SerDes 100, the Slave 20, and the S_SerDes 200 with each other.

The M_SerDes 100 includes a controller 101, an encapsulator (Enc) 150, a Link Layer Block (hereinafter, referred to as DLL or LINK in some cases) 120, a PHY Layer Block (PHY) 110, a de-encapsulator (DeEnc) 160, a timer 102, and input/output buffers 103 and 104.

The controller 101 determines, on the basis of time information from the timer 102, a time stamp as a starting point and a unit period of the time stamp starting from the starting point. In addition, the controller 101 performs control of the Enc 150 to generate an UP Link packet and the DeEnc 160 to retrieve a Down Link packet. Further, the controller 101 acquires, through I2C communication, GPIO setting information and set values of a unit period and a sampling period from the Master 10. That is, the controller 101 has an I2C controller function with the Master 10. Further, the controller 101 determines, on the basis of header information in the GPIO packet extracted from the Down Link packet received from the S_SerDes 200, whether the data in the received GPIO packet includes all pieces of sampling data sampled at a constant sampling period or sampling data sampled at a sampling interval corresponding to logical changes of the GPIO signal and a sampling position.

Here, the unit period is the time interval of the time stamp. The M_SerDes 100 and the S_SerDes 200 may be given a unit period as setting information. Alternatively, the Master 10 may transmit, through I2C communication, information regarding a unit period to the controller 101 in the M_SerDes 100 and a controller 201 in the S_SerDes 200.

The encapsulator 150 synchronizes the GPIO signal from the Master 10 with the time stamp for each unit period designated by the controller 101 to generate one of a packet of a predetermined communication protocol including all pieces of sampling data sampled at a constant sampling period and a packet of a predetermined communication protocol including sampling data sampled at a sampling interval corresponding to logical changes of the GPIO signal and a sampling position. In a full sampling mode (first mode), the encapsulator 150 generates a first GPIO packet including all pieces of sampling data obtained by sampling a first GPIO signal received from the Master, in a sampling period starting from the starting point. In an edge sampling mode (second mode), the encapsulator 150 generates, in the case where the value of sampling data sampled at first sampling timing differs from the value of sampling data sampled at second sampling timing the sampling period after the first sampling timing, a first GPIO packet including sampling data sampled at second sampling timing and first time information indicating second sampling timing.

The DLL 120 generates an UP Link packet by combining the packet generated by the Enc (referred to also as "GPIO packet") with other transmission packets. Further, the DLL 120 receives the Down Link packet transmitted from the S_SerDes 200 via the Down Link, extracts a GPIO packet from the Down Link packet, and transmits the extracted GPIO packet to the de-encapsulator 160.

The PHY 110 outputs, to the transmission path, the UP Link packet from the DLL 120 in accordance with the UP Link output timing by TDD. Further, the PHY 110 receives the Down Link packet transmitted from the S_SerDes 200 and transmits the received Down Link packet to the DLL 120.

Under the control of the controller 101, the de-encapsulator 160 receives the GPIO packet extracted by the DLL 120 from the Down Link packet, and converts the received GPIO packet into a GPIO signal. The de-encapsulator 160 transmits the converted GPIO signal to the Master 10 via the input/output buffer. The de-encapsulator 160 reproduces a second GPIO signal on the basis of mode information, a starting point, a sampling period, and a second GPIO packet. More specifically, the de-encapsulator 160 reproduces the second GPIO signal by assigning, in the full sampling mode (first mode) in which one or more pieces of sampling data are included in a second GPIO packet, each of the one or more pieces of sampling data included in the second GPIO packet to respective pieces of sampling data sampled every time the sampling period elapses starting from the starting point.

The encapsulator 150 reproduces, in the edge sampling mode (second mode) in which each of the one or more pieces of sampling data is included in the second GPIO packet in association with second time information indicating sampling timing, the second GPIO signal by repeating processing of assigning the sampling data corresponding to the second time information at the sampling timing indicated by the second time information and assigning the same sampling data for each sampling period until the sampling timing corresponding to the next second time information in the second GPIO packet.

The timer 102 outputs time information. The time information from the timer 102 is input to the controller 101, the encapsulator 150, and the de-encapsulator 160. As will be described below, the encapsulator 150 adds, on the basis of the time information from the timer 102, time stamp information or time information to a GPIO packet.

The Slave 20 includes a controller 21, a timer 22, and input/output buffers 23 and 24. In FIG. 1, only the block structure relating to GPIO communication within the Slave 20 is illustrated. The Slave 20 may have a function other than the GPIO communication, but such a function is omitted in FIG. 1. The controller 21 performs control of transmitting/receiving a GPIO signal to/from the S_SerDes 200 via the input/output buffers 23 and 24. As will be described below, the timer 22 is capable of time-synchronizing the S_SerDes 200, the Master 10, and the M_SerDes 100 with each other.

The S_SerDes 200 includes the controller 201, an encapsulator (Enc) 250, a Link Layer Block (DLL) 220, a PHY Layer Block (PHY) 210, a de-encapsulator (DeEnc) 260, a timer 202, input/output buffers 203 and 204, and an I2C controller 270.

The controller 201 determines, on the basis of the header information in the GPIO packet extracted from the UP Link packet received from the M_SerDes 100, whether the data in the received GPIO packet includes all pieces of sampling data sampled at a constant sampling period or sampling data sampled at a sampling interval corresponding to logical changes of the GPIO signal and a sampling position. Further, the controller 201 controls the Enc 250 to generate a packet and the DeEnc 260 to extract a GPIO signal from the packet. The controller 201 has a function of performing I2C communication with the Slave 20 via the I2C controller 270. The function of the I2C controller 270 may be included in the controller 201.

The Enc 250 synchronizes the GPIO signal from the Slave 20 with a time stamp for each unit period to generate one of a packet (GPIO packet) of a predetermined communication protocol including all pieces of sampling data sampled at a constant sampling period and a packet (GPIO packet) of a predetermined communication protocol including sampling data sampled at a sampling interval corresponding to logical changes of the GPIO signal and a sampling position.

The DLL 220 generates a Down Link packet by combining the GPIO packet generated by the Enc 250 with other transmission packets. Further, the DLL 220 extracts a GPIO packet from the UP Link packet received from the M_SerDes 100 via the UP Link and transmits the extracted GPIO packet to the DeEnc 260.

The PHY 210 outputs, to the transmission path, the Down Link packet from the DLL 220 in accordance with the Down Link output timing by TDD. Further, the PHY 210 receives the UP Link packet transmitted from the M_SerDes 100 and transmits the received UP Link packet to the DLL 220.

Under the control of the controller 201, the DeEnc 260 receives the GPIO packet extracted by the DLL 220 from the UP Link packet and converts the received GPIO packet into a GPIO signal. The DeEnc 260 transmits the converted GPIO signal to the Slave 20 via the input/output buffers 203 and 204.

The timer 202 outputs time information. The time information from the timer 202 is input to the controller, the Enc 250, and the DeEnc 260. As will be described below, the Enc 250 adds, on the basis of the time information from the timer 202, a time stamp to a GPIO packet.

Figure 2A:
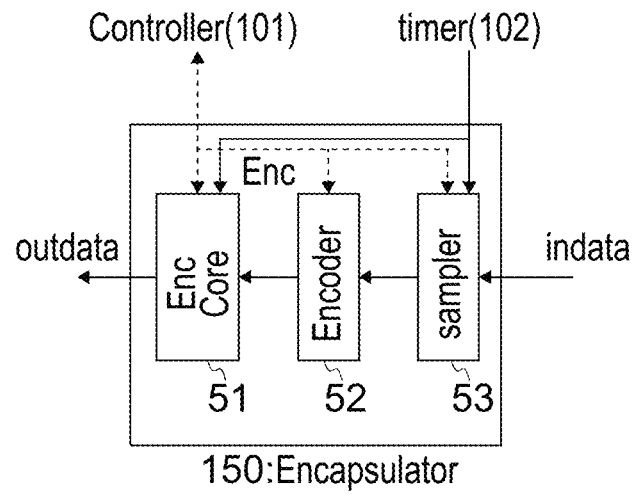
FIG. 2A is a block diagram showing an internal configuration of an encapsulator 150 in a M_SerDes 100.

FIG. 2A is a block diagram showing an internal configuration of the encapsulator 150 in the M_SerDes 100. Note that also the internal configuration of the Enc 250 in the S_SerDes 200 is similar to that in FIG. 2A. As shown in FIG. 2A, the encapsulator 150 includes a sampler 53, an encoder 52, and an Enc core 51.

The sampler 53 samples, at a constant sampling period, a GPIO signal transmitted from the Master 10, and transmits all pieces of sampling data that have been sampled or transmits sampling data sampled at a sampling interval corresponding to logical changes of the GPIO signal and a sampling position. As will be described below, in this specification, sampling a GPIO signal at a constant sampling period is referred to as full sampling, and sampling a GPIO signal at a sampling interval corresponding to logical changes of the GPIO signal is referred to as edge sampling. In more detail, in the full sampling, a GPIO signal is sampled for each sampling period and all pieces of sampling data that have been sampled are transmitted. In the edge sampling, a GPIO signal is sampled for each sampling period, and sampling data sampled at the sampling interval in which the GPIO signal is logically changed and a sampling position are transmitted as a pair.

The encoder 52 encodes the data sampled by the sampler 53. The Enc core 51 generates a GPIO packet by adding header information and a time stamp to the encoded data encoded by the encoder 52. The GPIO packet generated by the Enc core 51 is transmitted to the DLL 120.

Figure 2B:
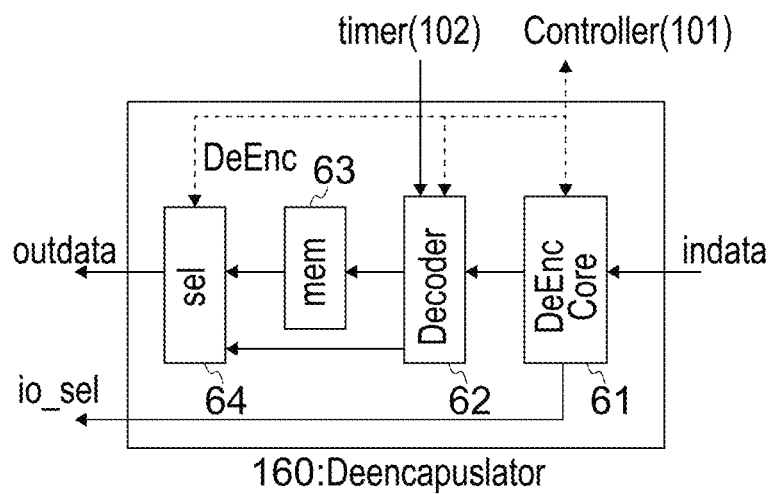
FIG. 2B is a block diagram showing an internal configuration of a de-encapsulator 160 in the M_SerDes 100.

FIG. 2B is a block diagram showing an internal configuration of the de-encapsulator 160 in the M_SerDes 100. Note that also the internal configuration of the DeEnc 260 in the S_SerDes 200 is similar to that in FIG. 2B. As shown in FIG. 2B, the de-encapsulator 160 includes a DeEnc core 61, a decoder 62, a memory (mem) 63, and a selector (sel) 64.

The DeEnc core 61 separates the GPIO packet extracted by the DLL from the Down Link packet received from the S_SerDes 200 via the transmission path and outputs the encoded data. The decoder 62 decodes the encoded data output from the DeEnc core 61 into the pre-encoded sampling data and temporarily stores the decoded sampling data in the memory 63. The selector 64 recovers the original GPIO signal on the basis of the sampling data stored in the memory 63 and the sampling data decoded by the decoder 62. The GPIO signal output from the selector 64 is transmitted to the Master 10 via the input/output buffers 103 and 104.

In FIG. 1, an example in which the Master 10 performs GPIO communication with one M_SerDes 100 and the Slave 20 performs GPIO communication with one S_SerDes 200 has been shown. However, it can be assumed that the Master 10 performs GPIO communication with a plurality of M_SerDeses 100 and a plurality of Slaves 20 performs GPIO communication with a plurality of S_SerDeses 200. That is, one Master 10 is capable of performing serial signal transmission with a plurality of Slaves 20 via a plurality of M_SerDeses 100 and a plurality of S_SerDeses 200.

Figure 3:
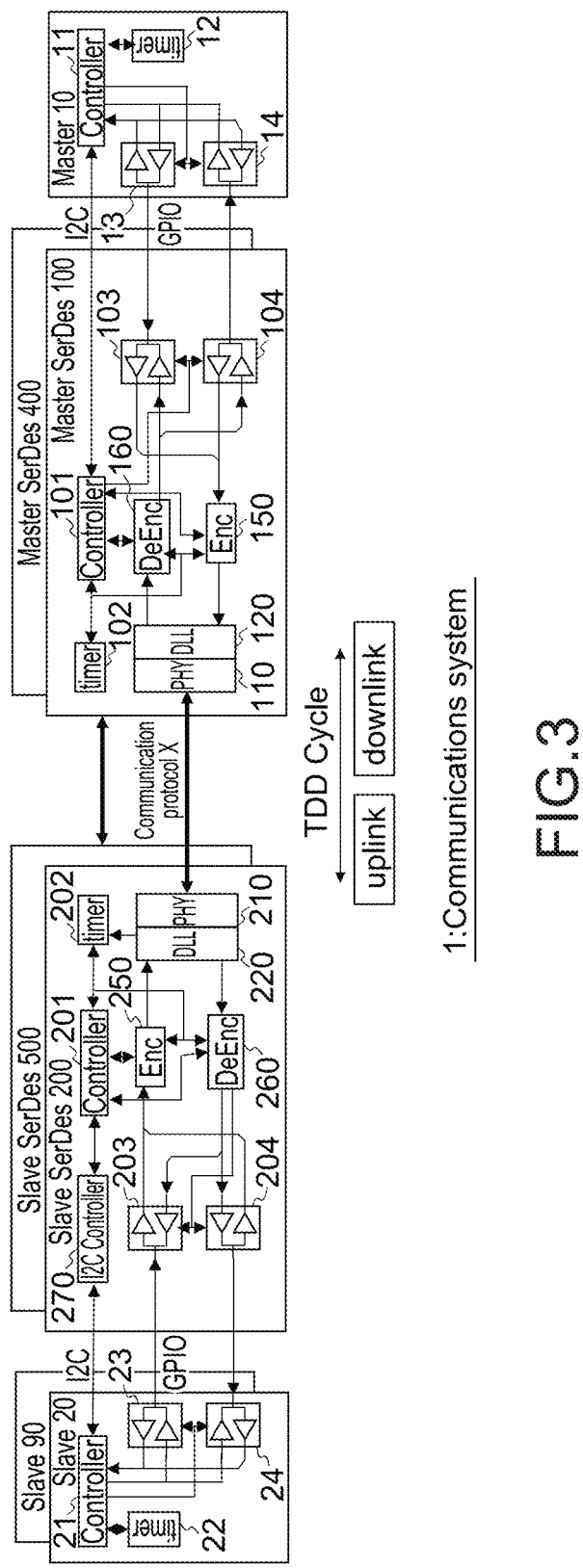
FIG. 3 is a block diagram showing a schematic configuration of a communications system including a plurality of M_SerDeses and a plurality of S_SerDeses.

FIG. 3 is a block diagram showing a schematic configuration of the communications system 1 including a plurality of M_SerDeses 100 and 400 that performs GPIO communication with the Master 10 and a plurality of S_SerDeses 200 and 500 that performs GPIO communication with a plurality of Slaves 20 and 90. The internal configuration of each of the M_SerDeses 100 and 400, the internal configuration of each of the S_SerDeses 200 and 500, and the internal configuration of each of the Slaves 20 and 90 are similar to those in FIG. 1. The Master 10 performs at least GPIO communication with the plurality of M_SerDeses 100 and 400. Each of the plurality of M_SerDeses 100 and 400 performs serial signal transmission with one of the plurality of S_SerDeses 200 and 500 by, for example, a TDD method. Each of the plurality of Slaves 20 and 90 performs at least GPIO communication with one of the plurality of S_SerDeses 200 and 500.

Figure 4:
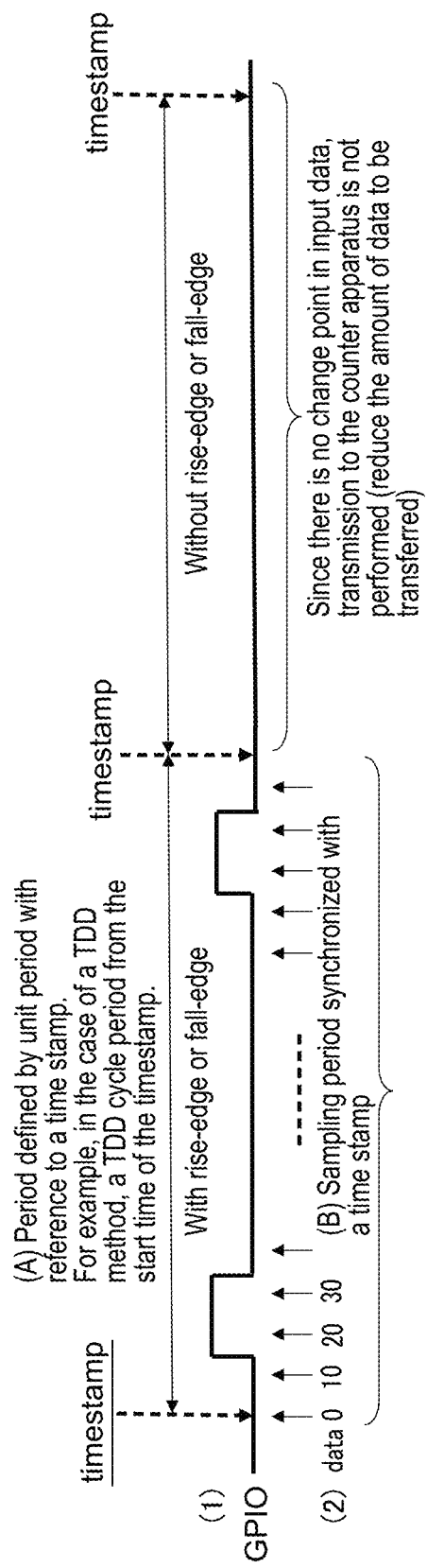
FIG. 4 is a diagram showing the relationship between a TDD cycle and a sampling period of an Enc in the M_SerDes.

FIG. 4 is a diagram showing the relationship between a TDD cycle and a sampling period of the encapsulator 150 in the M_SerDes 100. Note that also the sampling period of the Enc 250 in the S_SerDes 200 is similar to the sampling period of the encapsulator 150 in the M_SerDes 100.

The controller 101 in the M_SerDes 100 sets a time stamp that is a starting point for sampling a GPIO signal by using the time information from the timer 102. Further, the controller 101 sets a time stamp for each TDD cycle (unit interval) of a TDD method. In FIG. 4, as an example, three time stamps are illustrated, and the time intervals of these time stamps coincide with the TDD cycles.

The sampler 53 in the encapsulator 150 samples a GPIO signal in synchronization with the time stamp set by the controller 101. As described above, the M_SerDes 100 selects, on the basis of the GPIO setting information from the Master 10, whether to perform full sampling or edge sampling. In more detail, the controller 101 acquires the GPIO setting information transmitted from the Master 10 through I2C communication, and selects, on the basis of the acquired GPIO setting information, whether to perform full sampling or edge sampling on the M_SerDes 100. The GPIO setting information includes at least one of sampling frequency information of the GPIO signal, GPIO pin setting information, GPIO configuration information, or data length information of the sampled data. The GPIO configuration information includes the number of pins for performing GPIO communication, GPIO pin setting information, and a time slot for storing GPIO communication information.

In the case where the M_SerDes 100 performs full sampling, the sampler 53 in the encapsulator 150 starts sampling in synchronization with a time stamp, and then samples a GPIO signal at a fixed period of time. In more detail, in the case of performing full sampling, the sampler 53 samples a GPIO signal in synchronization with rise-edge or fall-edge of a clock (not shown) synchronized with the time stamp.

Further, in the case of performing edge sampling, the sampler 53 starts sampling in synchronization with a time stamp and performs sampling for each sampling period similarly to the case of full sampling and transmits sampling data when the GPIO signal is logically changed together with a sampling position. Therefore, as shown in the latter half period of FIG. 4, since sampling data is not transmitted in the case where the logic of the GPIO signal is not changed in one TDD cycle, the amount of data of the sampling data can be reduced.

The Master 10 designates, by the GPIO setting information, whether the M_SerDes 100 and the S_SerDes 200 perform full sampling or edge sampling on the GPIO signal. As will be described below, the GPIO setting information includes GPIO mode information. In the case where the GPIO mode information represents a full sampling mode, the M_SerDes 100 and the S_SerDes 200 perform full sampling. In the case where the GPIO mode information represents an edge sampling mode, the M_SerDes 100 and the S_SerDes 200 perform edge sampling.

Figure 5:
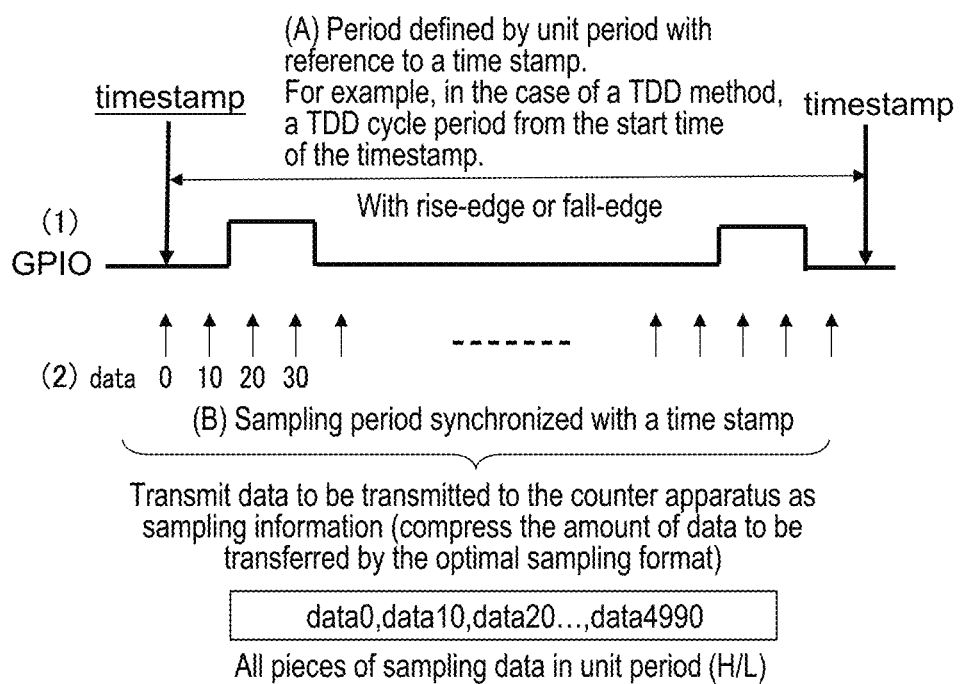
FIG. 5 is a diagram describing full sampling in detail.

FIG. 5 is a diagram describing full sampling in detail. In the case where the Master 10 sets the full sampling mode, the M_SerDes 100 and the S_SerDes 200 perform full sampling. In the full sampling, a GPIO signal is sampled at a constant time interval during adjacent two times stamps. In the case where the M_SerDes 100 and the S_SerDes 200 performs serial signal transmission by a TDD method, the interval of the adjacent two time stamps is one TDD cycle. The sampler 53 starts sampling a GPIO signal in synchronization with the time stamp as a starting point.

In the example of FIG. 5, sampling is started in synchronization with the top time stamp, and sampling data 0 is acquired. The sampling data is 1-bit data of 0 or 1. After that, sampling is performed a total of, for example, 500 times in one TDD cycle. The 500 sampled data, i.e., the sampling data 0, data 10, . . . , data 4990 are sequentially placed to generate a packet including 500-bit serial data. As will be described below, in addition to the serial data shown in FIG. 5, header information and a time stamp are added to the actual packet.

The sampling frequency of the sampler 53 is designate by the GPIO setting information by the Master 10 as described below. The higher the sampling frequency, the more accurately the GPIO signal can be sampled. However, the amount of data of the sampling data increases and the amount of packets transmitted/received between the M_SerDes 100 and the S_SerDes 200 increases. The Master 10 sets the optimal sampling frequency suitable for the GPIO signal.

Note that although 500 pieces of sampling data are sequentially placed to generate a packet in the example of FIG. 5, a packet including position information of each piece of sampling data and the sampling data may be generated. Further, the sampler 53 may sample a GPIO signal at the rise-edge or the fall-edge of a clock.

Figure 6:
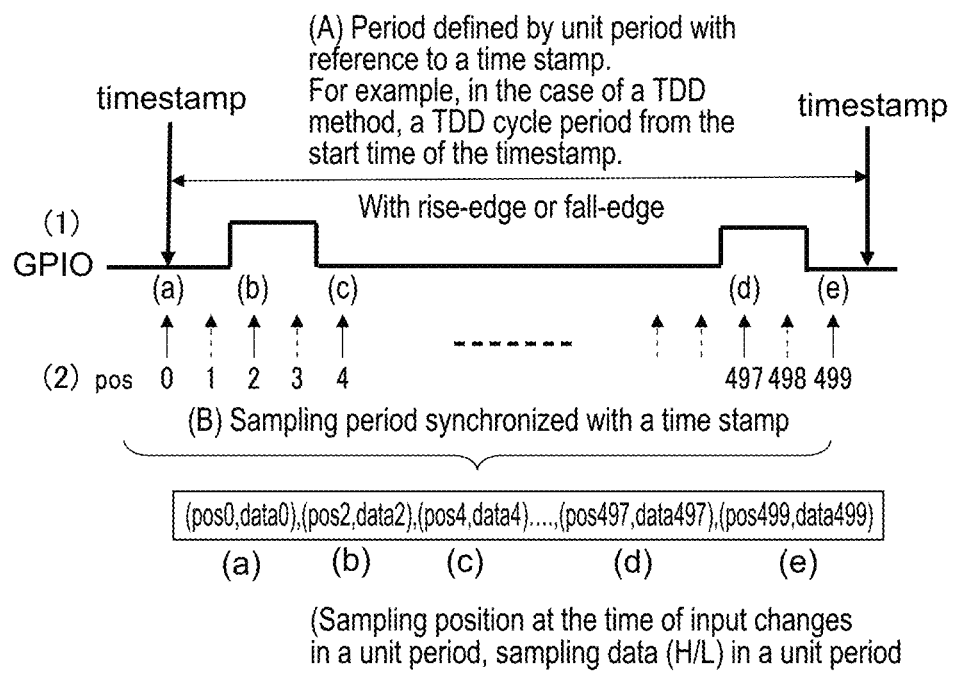
FIG. 6 is a diagram describing edge sampling in detail.

FIG. 6 is a diagram describing edge sampling in detail. In the case where the Master 10 sets the edge sampling mode, the M_SerDes 100 and the S_SerDes 200 perform edge sampling. In the edge sampling, sampling data sampled at the timing when a logical change of a GPIO signal has occurred is transmitted together with a sampling position during adjacent two time stamps. In more detail, sampling is started in synchronization with a time stamp (a) as a starting point to acquire the sampling data 0. After that, sampling is performed at a constant sampling period, but sampling data and a sampling position are transmitted as a pair only in the case where the logic of the GPIO signal has changed ((b), (c), (d), (e)). In the example of FIG. 6, the time interval between adjacent two time stamps is one TDD cycle, and a sampling period of a constant interval is provided within this one TDD cycle. Of the plurality of pieces of sampling data, the sampling data at the sampling timing located immediately after the timing when the logic of the GPIO has changed is transmitted together with a sampling position. In FIG. 6, the sampling timing when the logical change of the GPIO signal has occurred is indicated by a solid arrow line, and the sampling timing when no logical change has occurred is indicated by broken arrow line. The sampling of the GPIO signal may be performed at the rise-edge or fall-edge of the clock.

In FIG. 6, an example of generating serial data in which a sampling position and sampling data are placed as a pair is shown. At the sampling position synchronized with the top time stamp, sampling data is transmitted even in the case where no logical change has occurred in the GPIO signal. That is, a sampling position pos 0 and the sampling data 0 are transmitted as a pair. After that, serial data is generated by using each sampling position and sampling data as a pair only at timings POS 2, POS 4, . . . , POS 499 when the GPIO signal has logically changed. By adding time stamp information and header information to the serial data in FIG. 6 to generate a GPIO packet.

Note that instead of using a sampling position and sampling data as a pair, time information of the sampling timing and sampling data may be used as a pair to generate a packet. The time information of the sampling timing does not need to be the absolute time, and may be the relative time from the sampling start time.

Figure 7:
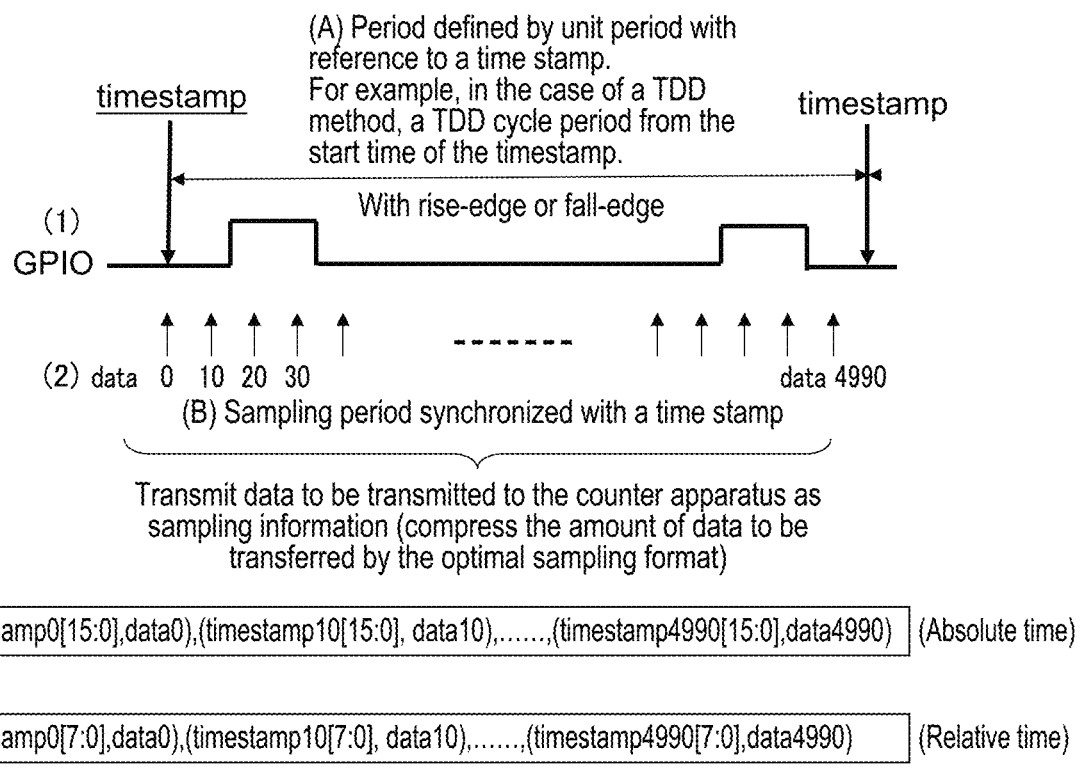
FIG. 7 is a diagram showing an example in which a sampling position is expressed by the absolute time or relative time within a unit period.

FIG. 7 is a diagram showing an example in which a sampling position is expressed by the absolute time or relative time within a unit period. Two types of data formats are illustrated in FIG. 7. The data format in the upper row shows an example in which the time information is a 16-bit absolute time, and the data format in the lower row shows an example in which the time information is an 8-bit relative time. The relative time is the time of the difference from the sampling start time. Alternatively, the relative time may be a bit string of part of the bit string representing the absolute time on the lower side. By representing the time information by the relative time, the amount of data of serial data in the packet can be significantly reduced.

As described above, the packet transmitted/received by the M_SerDes 100 and the S_SerDes 200 via the transmission path includes time stamp information and GPIO header information in addition to the serial data in the data format shown in FIG. 5 to FIG. 7. FIG. 8 is a diagram showing an example of GPIO header information. Although the GPIO header information in FIG. 8 differs between the full sampling and the edge sampling as will be described below in detail, pieces of information included in the GPIO header information at both sampling times are collectively illustrated in FIG. 8.

As shown in FIG. 8, the GPIO header information includes a GPIO mode (GPIO mode (T)), GPIO pin information (GPIO Pin info (U) or (R)), data placement information (Data placement (W)).

Time stamp information t_stamp (S) is one bit. In the case where the time stamp information t_stamp (S) is 0, no time stamp is present. In the case where the time stamp information t_stamp (S) is 1, time information is newly inserted immediately after the time stamp information t_stamp (S).

The GPIO mode (T) is, for example, 3-bit information. The highest bit being 1 indicates the edge sampling. The lower 2 bits of the 3 bits of the GPIO mode (T) being 00 indicate that the GPIO header information includes GPIO configuration information(configuration) and data information. The lower 2 bits being 01 indicate that the GPIO header information includes GPIO configuration information but does not include data information. The lower 2 bits being 10 indicates that the GPIO header information includes data information but does not include GPIO configuration information. The lower 2 bits being 11 indicate that the GPIO header information includes user definition information (User define).

The GPIO pin information (U) or (R) includes a pin number. The pin number is represented by, for example, 4 bits from the fourth bit to the seventh bit of the GPIO header information. Further, the lower 2 bits of the GPIO header information indicate whether the pin is disabled, signal input, high impedance signal input, or signal output.

The data placement information (W) is 2-bit information. The data placement information (W) being 00 indicates that serial data is transmitted using 8 time slots for 1 pin. The data placement information (W) being 01 indicates that serial data is transmitted by up to 2 pins using 4 time slots for each pin. The data placement information (W) being 10 indicates that serial data is transmitted by up to 4 pins using 2 time slots for each pin. The data placement information (W) being 11 indicates that serial data is transmitted by up to 16 pins using 1 time slot for each pin. A specific example of the data placement information (W) is shown in FIG. 12 described below.

Of the individual information shown in FIG. 8, the GPIO header information at the time of full sampling includes (T) and (U) in FIG. 8, and the GPIO header information at the time of edge sampling includes (T) and (R) in FIG. 8.

FIG. 9A, FIG. 9B, and FIG. 9C are each a diagram showing a data structure of a packet transmitted by the M_SerDes 100 or the S_SerDes 200.

FIG. 9A shows the case where a packet including only GPIO header information is transmitted. The packet in this case includes time stamp information, header information, and CRC that is an error detection signal. The packet in FIG. 9A includes no data.

FIG. 9B shows the case where a packet including only sampling data is transmitted. The packet in this case includes time stamp information, data of full sampling or edge sampling, and CRC. The packet in FIG. 9B does not include GPIO header information.

FIG. 9C shows the case where a packet including GPIO header information and sampling data is transmitted. The packet in this case includes time stamp information, GPIO header information, data of full sampling or edge sampling, and CRC. Thus, the packet in FIG. 9C is used in the case of transmitting GPIO header information and data in combination.

Each of the packets in FIG. 9B and FIG. 9C includes serial data in which a plurality of pieces of sampling data is sequentially placed at the time of full sampling, and serial data in which a plurality of pairs of sampling position information and sampling data is sequentially placed at the time of edge sampling. The packets in FIG. 9A, FIG. 9B, and FIG. 9C show the example in which the time stamp information t_stamp (S) is 0. In the case where the time stamp information t_stamp (S) is 1, time information is inserted between the time stamp information t_stamp (S) and GPIO header information in the packet in FIG. 9A, time information is inserted between the time stamp information t_stamp (S) and sampling information in the packet in FIG. 9B, and time information is inserted between the time stamp information t_stamp (S) and GPIO header information in the packet in FIG. 9C.

Figure 10:
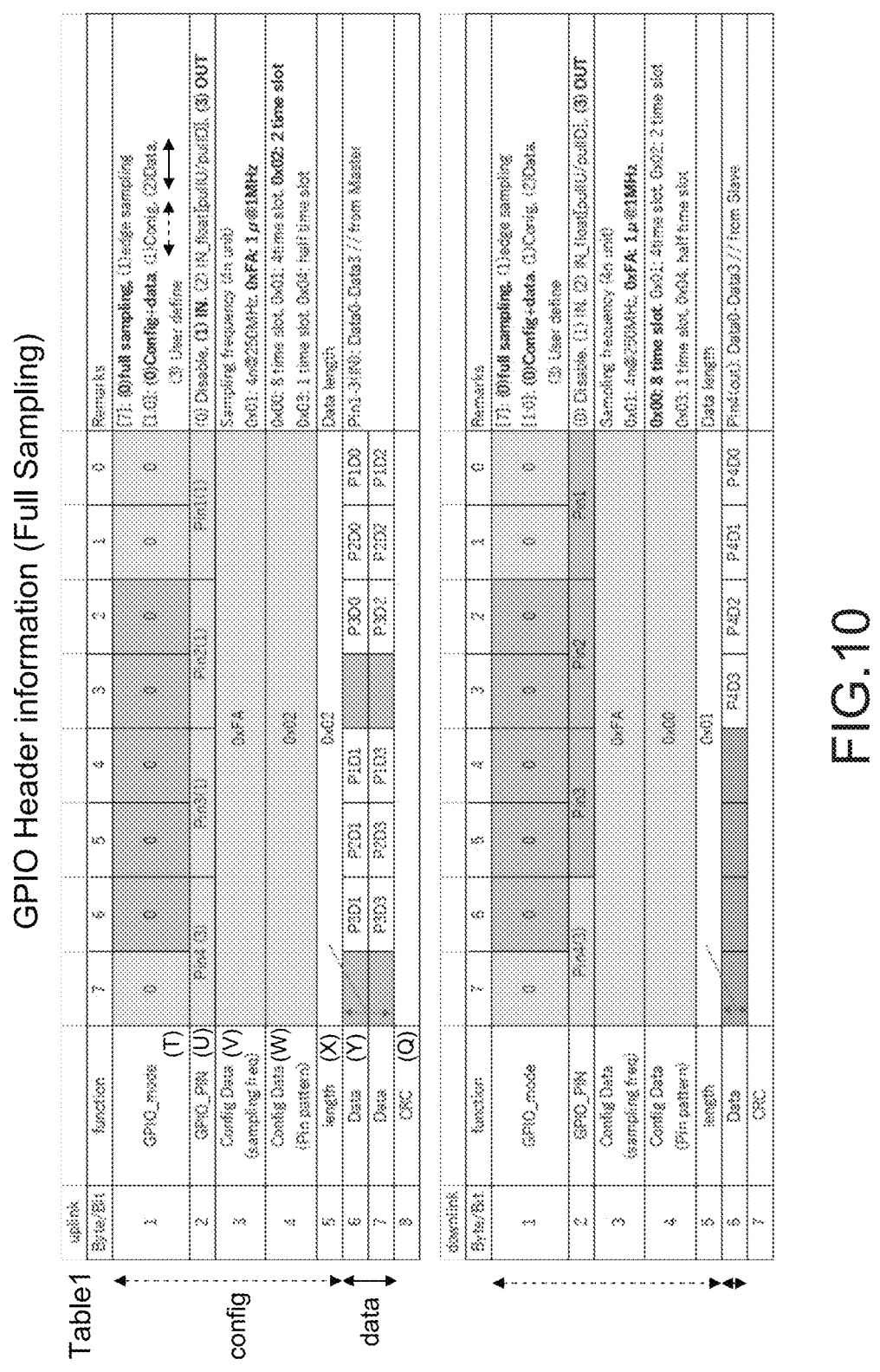
Figure 11:
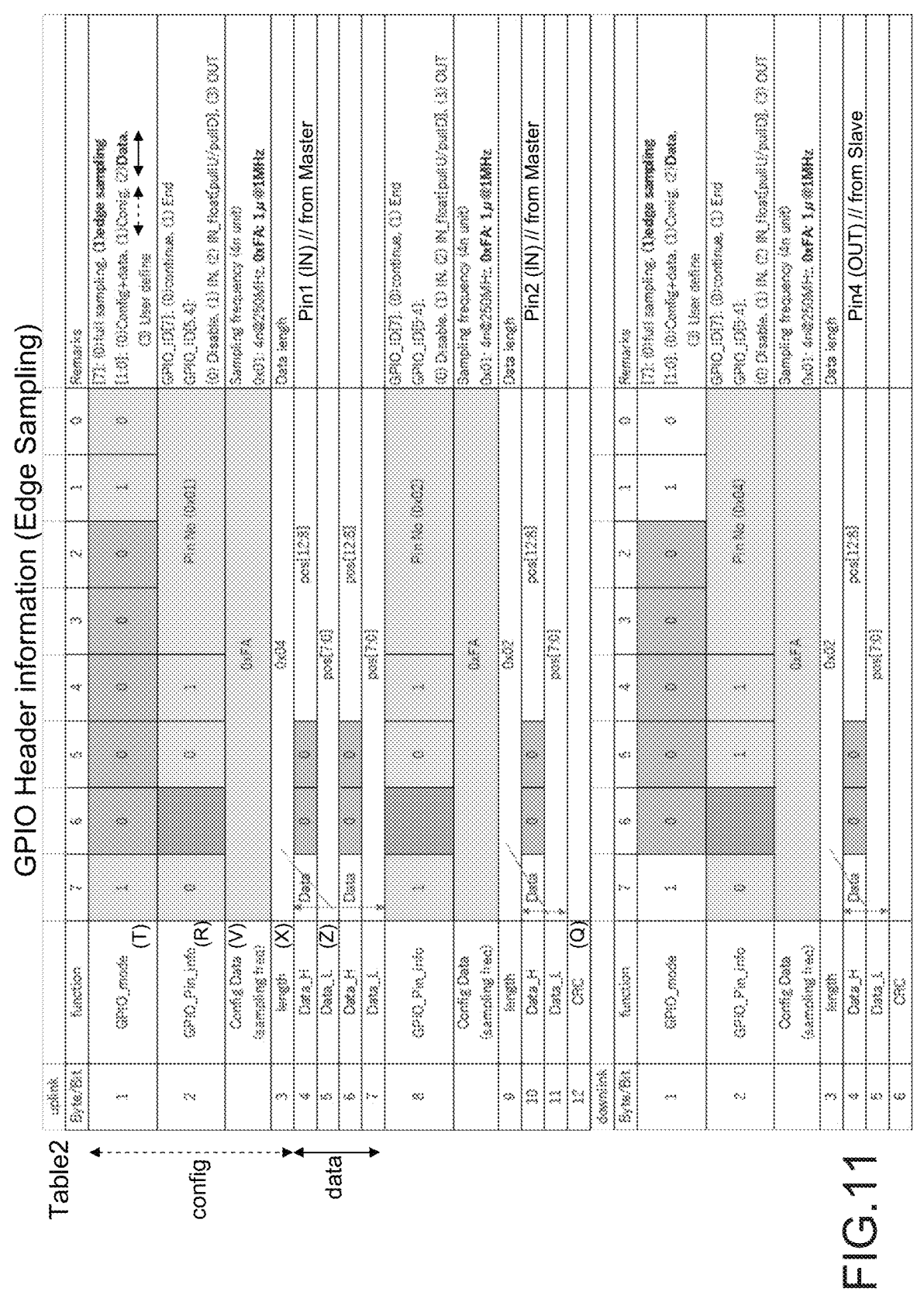

FIG. 10 and FIG. 11 are each a diagram showing details of GPIO header information included in a GPIO packet generated by the encapsulator 150 in the M_SerDes 100 or the Enc 250 in the S_SerDes 200.

(GPIO Header Information at Time of Full Sampling)

FIG. 10 shows GPIO header information in the case of performing full sampling, and FIG. 11 shows GPIO header information in the case of performing edge sampling. As will be appreciated by comparing FIG. 10 and FIG. 11 with each other, the GPIO packet transmitted by the UP Link and the GPIO packet transmitted by the Down Link partially differ in the GPIO header information. Further, the GPIO header information differs also depending on whether full sampling or edge sampling is performed.

The header information of the GPIO packet generated by the encapsulator 150 in the M_SerDes 100 is eight bytes described as UP Link in FIG. 10. The header information of the GPIO packet for the UP Link in FIG. 10 shows an example in which two time slots are selected as described below. The two time slots represents that up to four pins (Pin 1 to Pin 4) are used to transmit one bit at a time in parallel, thereby transmitting one byte of data by the two time slots. Note that the time slots indicates how many pieces of sampling data of GPIO signals are transmitted at the same time.

The first byte of the header information of the GPIO packet for the UP Link in FIG. 10 is the GPIO mode (T), and a bit [7] and a bit [1:0] are used. In the case where the bit [7] is 0, full sampling is performed. In the case where the bit [7] is 1, edge sampling is performed. The bit [1:0] being 00 indicates that the second and subsequent bytes include GPIO configuration information and data information. The bit [1:0] being 01 indicates that the second and subsequent bytes include only GPIO configuration information. The bit [1:0] being 10 indicates that the second and subsequent bytes include only data information. The bit [1:0] being 11 indicates that the second and subsequent bytes include user definition information.

The second byte is the GPIO pin information (U). The bit [1:0] is information of Pin 1, the bit [3:2] is information of Pin 2, the bit [5:4] is information of Pin 3, and the bit [7:6] is information of Pin 4. Thus, the information of the respective pins Pin 1 to Pin 4 is represented by two bits, and 00, 01, 10, and 11 respectively represent being disabled, signal input, high impedance signal input, and signal output.

In the case of two time slots, up to four pins can be used for signal input or signal output. In the example of FIG. 10, the Pin 1 to Pin 3 are used for signal input and the Pin 4 is used for signal output. That is, the Pin 1 to Pin 3 are used for the UP Link, and the Pin 4 is used for the Down Link.

The third byte is a sampling frequency that is part (V) of the pin configuration information. For example, the sampling frequency is 250 MHz (sampling period is 4 nsec) in the case where the third byte is 0x01, and the sampling frequency is 1 MHz (sampling period is 1 μsec) in the case where the third byte is 0xFA.

The fourth byte is pin placement (pin pattern) that is part (W) of the pin configuration information. For example, in the case where the fourth byte is 0x00, 0x01, 0x02, 0x03, and 0x04, 8 times slots, 4 time slots, 2 time slots, 1 time slot, and a half time slot are used, respectively. In the example of FIG. 10, 0x02 indicating 2 time slots is described.

FIG. 12 is a diagram describing details of pin placement. In the case where the fourth byte of the header information is 8 time slots, it takes 8 time slots to transmit one byte of data because serial signal transmission is performed one bit at a time using 1 pin. In the case of 4 time slots, it takes 4 time slots to transmit one byte of data because serial signal transmission is performed one bit at a time by each pin using 2 pins. In the case of 2 time slots, it takes 2 time slots to transmit one byte of data because serial signal transmission is performed one bit at a time by each pin using 4 pins. In the case of 1 time slot, it takes 1 time slot to transmit one byte of data because serial signal transmission is performed one bit at a time by each pin using 8 pins. In the case of a half time slot, it takes a half time slot to transmit two bytes of data because serial signal transmission is performed one bit at a time by each pin using 16 pins.

In the case where the logic of the data in the packet does not change, the potential of each pin corresponding to the selected time slot only needs to be fixed to a high potential or a low potential.

With reference to FIG. 10 again, the fifth to seventh bytes (X) and (Y) of the header information of the GPIO packet for the UP Link are data information. The fifth byte is a data length. In the example of FIG. 10, 0x02 is described, which indicates that the data length is 2 bytes. The sixth to seventh bytes indicate data placement of each pin of data transmitted by the UP Link. In the example of FIG. 10, the Pin 1 to Pin 3 transmits four types of data, i.e., Data 0 to Data 3, in parallel. Specifically, an example in which the Pin 1 to Pin 3 transmits the Data 0 one bit at a time, the Pin 1 to Pin 3 transmits the Data 1 one bit at a time, the Pin 1 to Pin 3 transmits the Data 2 one bit at a time, and then the Pin 1 to Pin 3 transmits the Data 3 one bit at a time is shown.

The eighth byte (Q) of the GPIO packet for the UP Link is error detection information (CRC). The receiving side of the packet is capable of detecting whether or not there is a bit error in the received packet by using the CRC attached to the received packet.

The first byte of the header information of the GPIO packet for the Down Link in FIG. 10 is a GPIO mode, which is the same as the GPIO mode for the UP Link. The second byte is GPIO pin information, which is the same as the GPIO pin information for the UP Link. In the example of FIG. 10, the Pin 4 is assigned for the Down Link. The third to fourth bytes are pin configuration information. In the example of FIG. 10, the fourth byte is 0x00, which indicates 8 time slots. The fifth byte is a data length. The sixth byte is data information. In the example of FIG. 10, four types of data (Data 0 to Data 3) are sequentially transmitted using the Pin 4. The seventh byte is CRC.

(GPIO Header Information at Time of Edge Sampling)

FIG. 11 shows GPIO header information of a GPIO packet in the case where sampling is performed. The first byte of the header information of the GPIO packet for the UP Link in FIG. 11 is the GPIO mode (T), which is the same as the GPIO mode of the header information in FIG. 10.

The second byte is the GPIO pin information (R). The bit [7] being 0 indicates to continue packet transmission, and the bit [7] being 1 indicates to finish packet transmission. The bit [5:4] being 00, 01, 10, and 11 respectively represent being disabled, signal input, high impedance signal input, and signal output. The bit [3:0] of the second byte is a pin number. 0x01 is described as the pin number, which represents the Pin 1.

Further, the second byte is capable of designating the sampling frequency information (V). The sampling frequency information is similar to the third byte in FIG. 10. The third byte is a data length similarly to the fifth byte in FIG. 10.

The third to seventh bytes are the data information (X) and (Z). In the case of edge sampling, there is no selection of time slot. The reason is that in the case of edge sampling, only the logical change point of each signal is transmitted and the number of pieces of data to be transmitted does not show the elapse of time of the data. Therefore, the timing information of the logical change point is transmitted for each signal.

In FIG. 11, an example in which the Pin 1 and Pin 2 are assigned for the UP Link and the Pin 4 is assigned for the Down Link is shown. The Pin 3 is don't care. The information of the Pin 1 is described in the fourth to seventh bytes of the UP Link in FIG. 11. In more detail, information of the first logical change point of the Pin 1 is described in the fourth to fifth bytes, and information of the second logical change point of the Pin 2 is described in the sixth to seventh bytes.

The information of the Pin 2 is described in the eighth to eleventh bytes of the UP Link in FIG. 11. In the example of FIG. 11, since the Pin 1 has two logical change points while the Pin 2 has one logical change point, the information of the first logical change point is described in the ninth to eleventh bytes for the Pin 2. The twelfth byte (Q) is information of CRC.

The first byte of the Down Link in FIG. 11 is GPIO mode information, and the second byte is GPIO pin information. 0x04 is described as the GPIO pin information, which is the pin number indicating the Pin 4. The information of the logical change point of the Pin 4 is described in the fourth to fifth bytes. The sixth byte is information of CRC.

(Operation of M_SerDes 100 at Time of Full Sampling)

Figure 13:
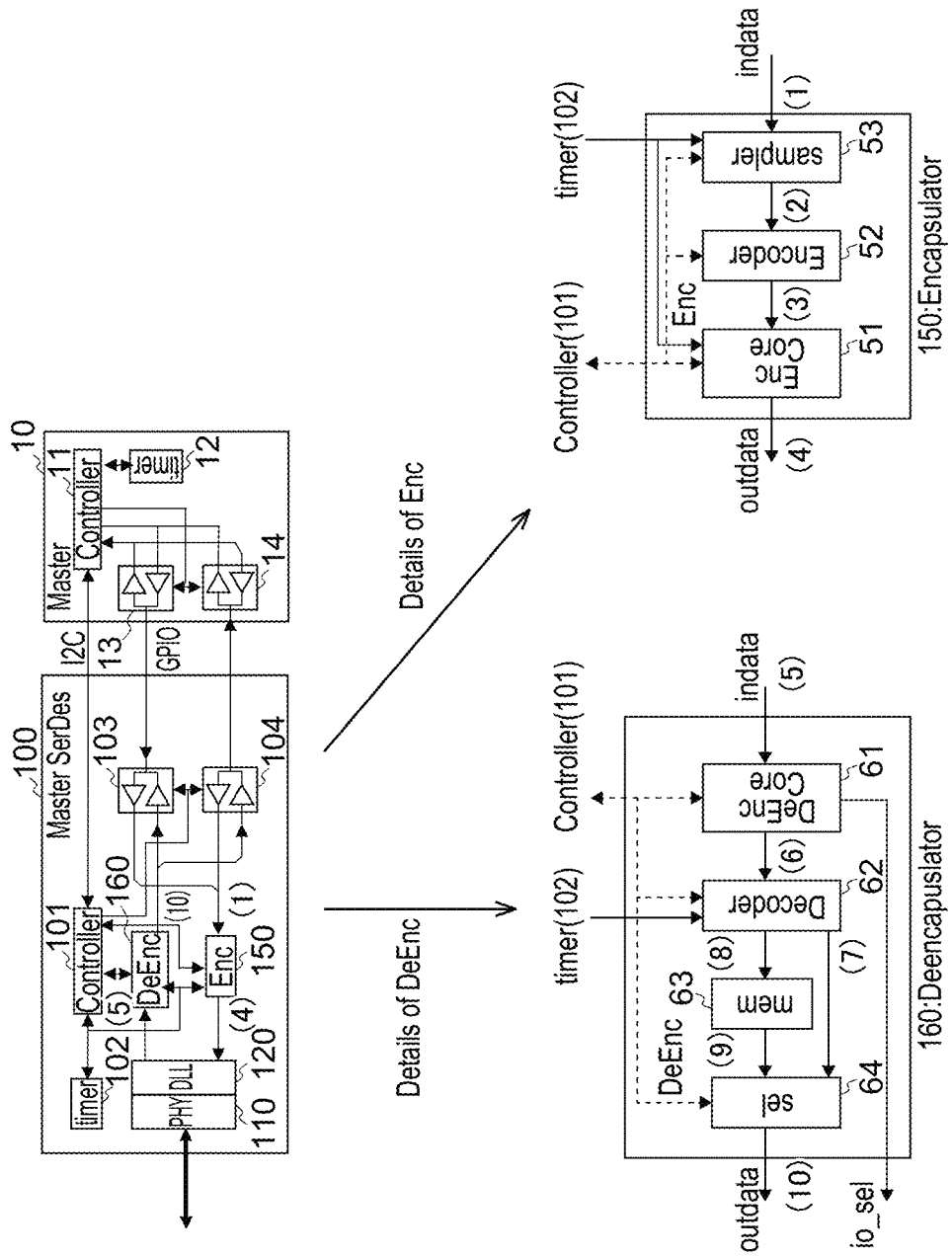
FIG. 13 is a diagram obtained by adding signal transmission orders (1) to (10) to a block diagram showing the internal configuration of a M_SerDes.
Figure 14:
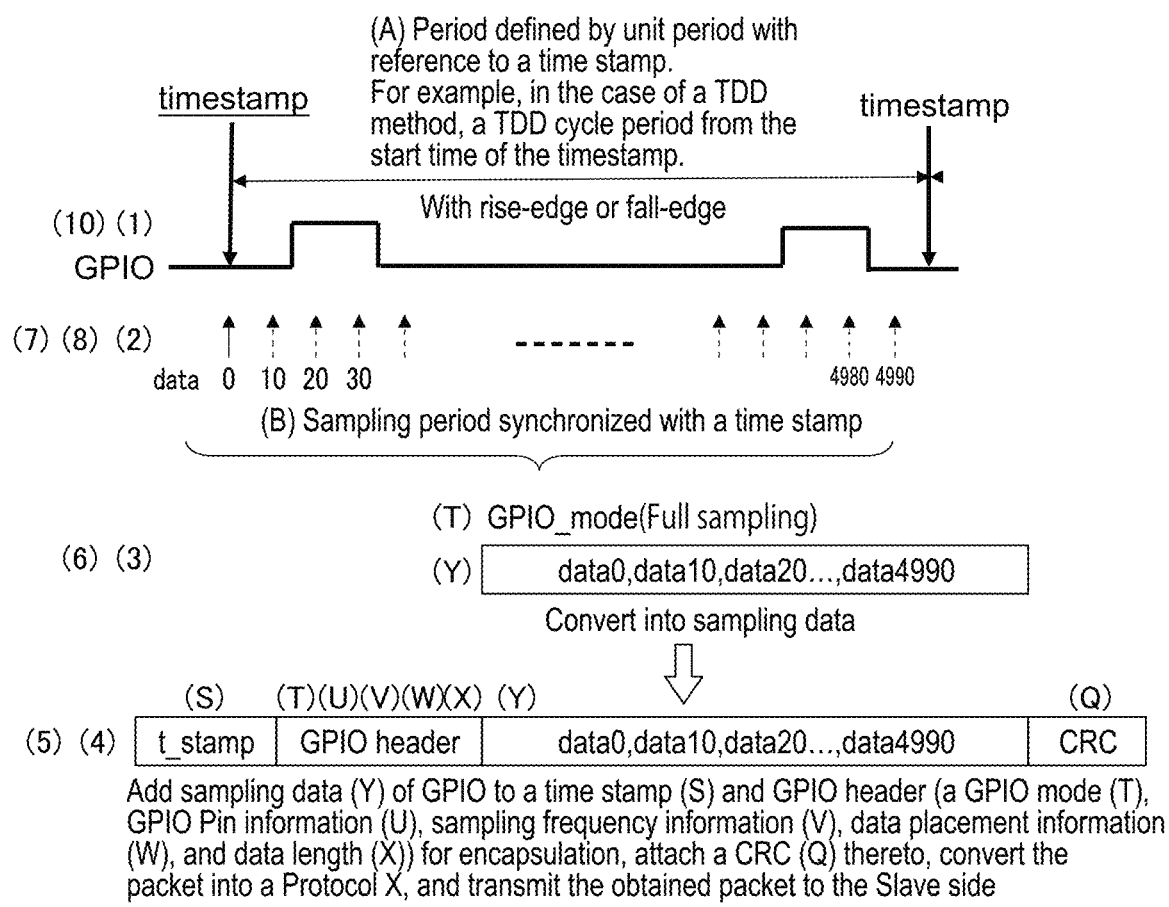
FIG. 14 is a diagram showing a sampling waveform of the M_SerDes, a GPIO packet, and an UP (Down) Link packet when full sampling is performed.

Next, the operation of the M_SerDes 100 at the full sampling will be described. FIG. 13 is a diagram obtained by adding signal transmission orders (1) to (10) to a block diagram showing the internal configuration of the M_SerDes 100. FIG. 14 is a diagram showing a sampling waveform of the M_SerDes 100, a GPIO packet, and an UP (Down) Link packet when full sampling is performed.

The Master 10 has a function of transmitting, to the controller 101 in the M_SerDes 100, GPIO header information ((R), (T), (U), (V), (W)), a time control command of the timer 102, and GPIO setting information using a protocol such as I2C. For example, the Master 10 writes a new setting time of the timer 102 as GPIO header information or a time control command to the corresponding register of the controller 101 through an I2C protocol. When a new setting time is written, the controller 101 is capable of synchronizing the time of the timer 12 in the Master 10 and the time of the timer 102 in the M_SerDes 100 with each other by reflecting the new setting time to the timer 102. Similarly, when the Master 10 writes the GPIO setting information (U) or (R) to the corresponding resister of the controller 101 through an I2C protocol, the controller 101 performs GPIO setting.

The M_SerDes 100 includes the controller 101, the timer 102, the input/output buffers 103 and 104, the encapsulator 150, the de-encapsulator 160, the LINK 120, and the PHY 110.

The controller 101 controls the timer 102, the input/output buffers 103 and 104, the encapsulator 150, and the de-encapsulator 160.

The encapsulator 150 has a function of (2) sampling the GPIO signal (1) from the Master 10 in the designated sampling period (V) by the time information input from the timer 102 and the GPIO header information ((T) to (X)) transmitted from the controller 101, converting the sampled GPIO signal into sampling data (Y) by (3) encoding in the designated GPIO mode (T), encapsulating the GPIO header information ((T) to (X)) and the time stamp information t_stamp (S) relating to time information transmitted from the controller 101 in the sampling data (Y), attaching the CRC (Q) thereto, and transmitting the obtained packet (4) to the LINK 120. As described above, the time stamp information t_stamp (S) is 1-bit information of 0 or 1.

The encapsulator 150 is capable of generating a GPIO packet including, as data, the time control command transmitted from the Master 10 through I2C communication and transmitting the generated GPIO packet to the S_SerDes 200. The S_SerDes 200 that has received this GPIO packet is capable of synchronizing the Master 10, the M_SerDes 100, and the S_SerDes 200 with each other by restoring the time control command in the GPIO packet and setting the restored time control command to the timer 202.

The de-encapsulator 160 de-encapsulates the input signal (5) from the LINK 120 by the GPIO header information ((T) to (W)) transmitted from the controller 101, (6) retrieves the sampling data (Y), (8) restores the original GPIO signal from the packet of the sampling data (Y), and writes the restored GPIO signal to the memory 63 as necessary.

The de-encapsulator 160 determines, in the case where the time stamp information t_stamp (S) in the received GPIO packet is 0, the output timing of the GPIO signal by the time information input from the timer 102. In this case, the restored GPIO signal is transmitted to the selector 64 without being written to the memory 63.

Meanwhile, the de-encapsulator 160 determines, in the case where the time stamp information t_stamp (S) in the received GPIO packet is 1, the output timing of the GPIO signal on the basis of the time information immediately thereafter. In this case, the de-encapsulator 160 has a function of writing the restored GPIO signal to the memory 63, reading the GPIO signal from the memory 63 at the timing when the time information input from the timer 102 coincides with the time information immediately after the time stamp information t_stamp (S), and (10) transmitting the read GPIO signal to the Master 10 via the selector 64.

Thus, by setting the time stamp information t_stamp (S) to 1, the GPIO signal can be transmitted to the Master 10 at the timing corresponding to the time information set by the Slave 20. Further, as will be described below, in the case where a plurality of Slaves 20, a plurality of M_SerDeses 100, and a plurality of S_SerDeses 200 are provided, the GPIO signal can be transmitted to the Master 10 at the timing corresponding to the time information set by the respective Slaves 20.

Further, the de-encapsulator 160 has a function of transmitting, in the case where new GPIO header information ((T) to (W)) is set after the de-encapsulation (6), the new GPIO header information to the controller 101.

Note that the GPIO header information transmitted from the controller 101 includes the GPIO mode (T) indicating the data format of data to be transmitted/received, the GPIO Pin information (U) being used, the sampling period information (V), the data array information (W), and the data length (X).

If the time stamp information t_stamp (S) in the GPIO packet after the de-encapsulation (6) is 0, the de-encapsulator 160 causes the restored GPIO signal to pass through the path (7) by the selection signal of the selector 64 from the controller 101, and the GPIO signal is transmitted to the Master 10 without delay (10).

(Operation of M_SerDes 100 at Time of Edge Sampling)

Figure 15:
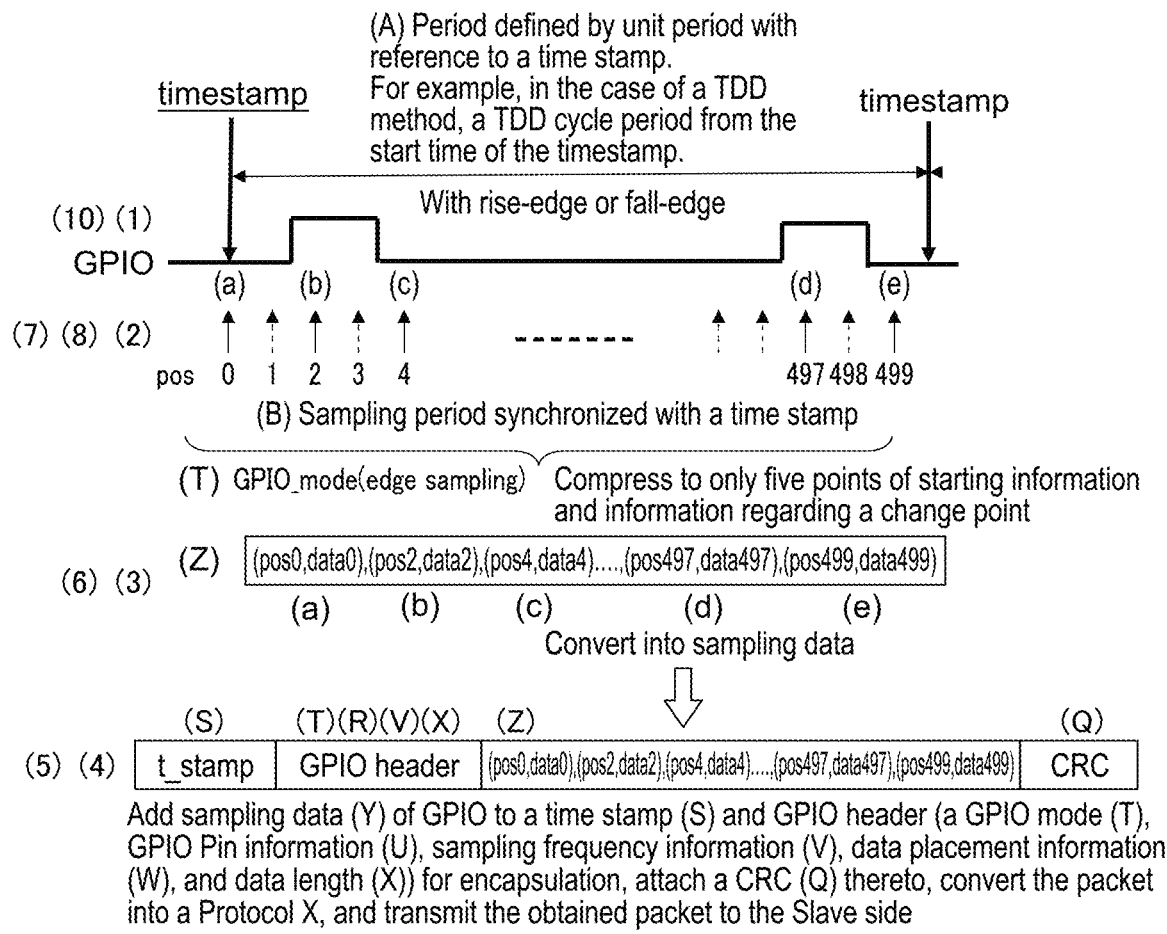
FIG. 15 is a diagram showing a sampling waveform of the M_SerDes 100, a GPIO packet, and an UP (Down) Link packet when edge sampling is performed.

FIG. 15 is a diagram showing a sampling waveform of the M_SerDes 100, a GPIO packet, and an UP (Down) Link packet when edge sampling is performed.

The Master 10 has a function of transmitting, to the controller 101 of the M_SerDes 100, GPIO header information ((R), (T) to (W)) a time control command of the timer 102, and GPIO setting information using a protocol such as I2C.

The controller 101 in the M_SerDes 100 controls the timer 102, the input/output buffers 103 and 104, the encapsulator 150, and the de-encapsulator 160.

The encapsulator 150 has a function of (2) sampling the GPIO signal (1) from the Master 10 in the designated sampling period by the time information input from the timer 102 and the GPIO header information ((R), (T), (V), (X)) transmitted from the controller 101, converting the sampled GPIO signal into sampling data (Z) by (3) encoding in the designated GPIO mode (T), capsulating the GPIO header information ((R), (T), (V), (X)) and the time stamp information t_stamp (S) relating to the time information transmitted from the controller 101 in the sampling data (Z), attaching the CRC (Q) thereto, and transmitting a packet (4) to the LINK 120.

The de-encapsulator 160 (6) de-encapsulates the input signal (5) from the LINK 120 by the GPIO header information ((R), (T), (V)) transmitted from the controller 101, (6) extracts the sampling data (Z), (8) restores the original GPIO signal from the packet of the sampling data (Z), and writes the restored GPIO signal to the memory 63. Further, the de-encapsulator 160 has a function of (9) reading the data written to the memory 63 after the time information input from the timer 102 and the time information immediately after the time stamp information t_stamp (S) coincide with each other and (10) transmitting the read data to the Master 10, a function of (8) restoring the original GPIO signal from the packet of the sampling data (Z) and (10) transmitting the restored GPIO signal to the Master 10, and a function of transmitting, in the case where new GPIO header information ((R), (T), (V)) has been set after the de-encapsulation (6), the new GPIO header information to the controller 101.

Note that the GPIO header information transmitted from the controller 101 includes the GPIO mode (T) indicating the data format of data to be transmitted/received, the Pin number & setting information (R) of the used GPIO, the sampling period information (V), and the data length (X).

If the time stamp information t_stamp (S) is 0 after the de-encapsulation (6) and there is no time information in the input data, the de-encapsulator 160 causes the GPIO signal to pass through the path (7) and the selector 64 by the selection signal from the controller 101 and transmitting the GPIO signal to the Master 10 without delay (10).

(Operation of S_SerDes 200 at Time of Full Sampling)

Figure 16:
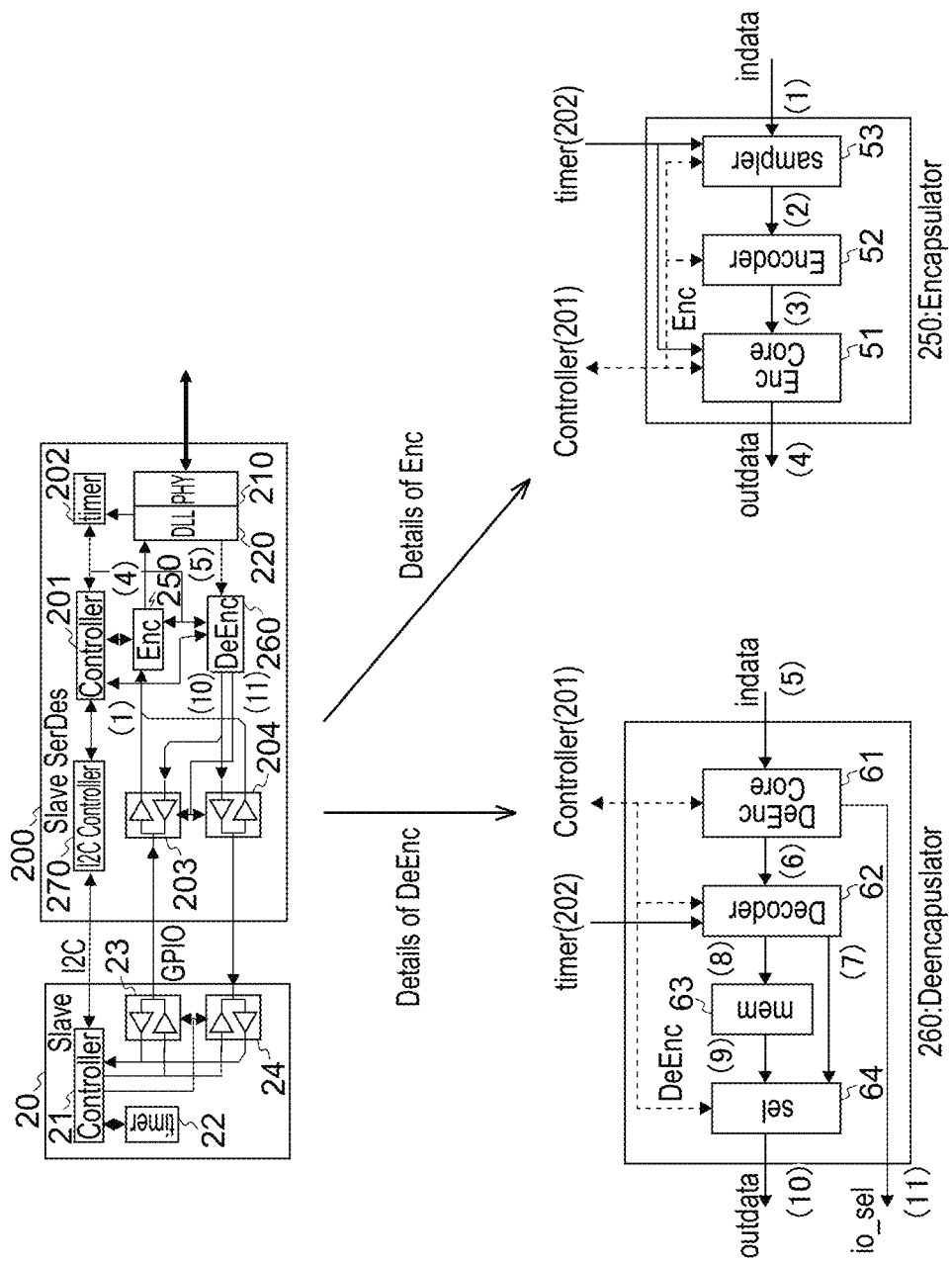
FIG. 16 is a diagram obtained by adding signal transmission orders (1) to (11) to a block diagram showing the internal configuration of an S_SerDes.

FIG. 16 is a diagram obtained by adding signal transmission orders (1) to (11) to a block diagram showing the internal configuration of the S_SerDes 200. FIG. 17 is a diagram showing an UP (Down) Link packet transmitted/received by the S_SerDes 200 when full sampling is performed.

The S_SerDes 200 includes the I2C controller 270, the controller 201, the timer 202, the input/output buffers 203 and 204, the de-encapsulator 260, and the encapsulator 250.

The I2C controller 270 communicates with the controller 21 of the Slave 20 using a protocol such as I2C.

The controller 201 has a function of controlling the LINK 220 and the PHY 210 that perform transmission/reception through the communication protocol X, and the timer 202, the Enc 250, the DeEnc 260, and the I2C controller 270 that are internal blocks. The controller 201 performs input/output control of a GPIO pin on the basis of the GPIO pin setting information transmitted from the Master 10 via the communication partner apparatus before starting GPIO communication with the Slave 20.

The de-encapsulator 260 has a function of de-encapsulating the packet (5) of the communication protocol X to restore the original GPIO signal and GPIO header information. The de-encapsulator 260 determines whether the sampling-mode information included in the header information in the first GPIO packet is the full sampling mode (first mode) indicating to include all pieces of sampling data obtained by sampling the GPIO signal transmitted from the Master at a constant sampling period or the edge sampling mode (second mode) indicating to include the sampling data sampled at a sampling interval corresponding to the frequency of logical changes of the GPIO signal and sampling position information, converts the first GPIO packet into a first GPIO signal, and transmits the converted first GPIO signal to the Slave. More specifically, the de-encapsulator 260 assigns, in the full sampling mode in which one or more pieces of sampling data are included in the first GPIO packet, each of the one or more pieces of sampling data included in the first GPIO packet to respective pieces of sampling data sampled every time the sampling period elapses starting from the starting point, and reproduces the first GPIO signal. The de-encapsulator 260 reproduces, in the edge sampling mode in which each of the one or more pieces of sampling data is included in the first GPIO packet in association with first time information indicating sampling timing of the sampling, the first GPIO signal by repeating processing of assigning the sampling data corresponding to the first time information at the sampling timing indicated by the first time information and assigning the same sampling data for each sampling period until the sampling timing of the next first time information in the first GPIO packet.

The encapsulator 250 samples and encapsulates the GPIO signal from the Slave 20 and transmits the packet (4) to the M_SerDes 100. The encapsulator 250 has a function of (2) sampling the GPIO signal (1) from the Slave 20 in the designated sampling period (V) by the time information input from the timer 202 and the GPIO header information ((T) to (X)) transmitted from the controller 201, (3) converting the sampled GPIO signal into sampling data (Y) by (3) encoding in the designated GPIO mode (T), encapsulating the GPIO header information ((T) to (X)) and the time information and time stamp information t_stamp (S) transmitted from the controller 201 in the sampling data (Y), attaching the CRC (Q) thereto, and transmitting the packet (4) to the LINK 220. The encapsulator 250 generates a second GPIO packet including sampling data obtained by sampling the second GPIO signal from the Slave 20 at a constant sampling period or a sampling interval corresponding to the frequency of logical changes of the GPIO signal starting from the starting point, and sampling position information. In more detail, the encapsulator 250 generate, in the full sampling mode, a second GPIO packet including all pieces of sampling data obtained by sampling the second GPIO signal received from the Slave in a sampling period starting from the starting point. The encapsulator 250 generates, in the edge sampling mode, in the case where the value of the sampling data sampled at the first sampling timing differs from the value of the sampling data sampled at the second sampling timing the sampling period after the first sampling timing, a second GPIO packet including the sampling data sampled at the second sampling timing and the time information indicating the second sampling timing.

The de-encapsulator 260 de-encapsulates the input signal (5) from the LINK 220 by the GPIO header information ((T) to (W)) transmitted from the controller 201, (6) extracts the sampling data (Y), (8) restores the original GPIO signal from the packet of the sampling data (Y), and writes the restored GPIO signal to the memory 63 as necessary.

The de-encapsulator 260 determines, in the case where the time stamp information t_stamp (S) in the received GPIO packet is 0, the output timing of the GPIO signal by the time information input from the timer 202. In this case, the restored GPIO signal is transmitted to the selector 64 without being written to the memory 63.

Meanwhile, the de-encapsulator 260 determines, in the case where the time stamp information t_stamp (S) in the received GPIO packet is 1, the output timing of the GPIO signal on the basis of the time information immediately after the time stamp information t_stamp (S). In this case, the de-encapsulator 260 has a function of writing the restored GPIO signal to the memory 63, reads the GPIO signal from the memory 63 at the timing when the time information input from the timer 202 coincides with the time information immediately after the time stamp information t_stamp (S), and (10) transmits the read GPIO signal to the Slave 20 via the selector 64.

As described above, the de-encapsulator 260 has a function of (9) reading, in the case where the time stamp information t_stamp (S) is 1, the data written to the memory 63 after the time information input from the timer 202 and the time information immediately after the time stamp information t_stamp (S) coincide with each other, and (10) transmitting the read data to the Slave 20.

Therefore, by setting the time stamp information t_stamp (S) to 1, the GPIO signal can be transmitted to the Slave 20 at the timing corresponding to the time information set by the Master 10. Further, as will be described below, in the case where a plurality of Slaves 20, a plurality of M_SerDeses 100, a plurality of S_SerDeses 200 are provided, the GPIO signal can be transmitted to each of the Slaves 20 at the same timing in accordance with the time information set by the Master 10.

Further, the de-encapsulator 260 has a function of performing, in the case where the setting information (U) of the input/output buffers 203 and 204 is included after the de-encapsulation (6), setting of the input/output buffers 203 and 204 in accordance with the content thereof, and a function of transmitting, in the case where new GPIO header information ((T) to (W)) is included after the de-encapsulation (6), the new GPIO header information to the controller 201.

The controller 201 is capable of synchronizing, in the case where a time control command to the timer 202 is included in the received GPIO packet, the timer of the timer 12 and the time of the timer 202 with each other by reflecting the new setting time included in the time control command to the timer 202.

(Operation of S_SerDes 200 at Time of Edge Sampling)

FIG. 18 is a diagram showing an UP (Down) Link packet transmitted/received by the S_SerDes 200 when edge sampling is performed. The encapsulator 250 in the S_SerDes 200 has a function of (2) sampling the GPIO signal (1) from the Slave 20 in the designated sampling period (V) on the basis of the time information input from the timer 202 and the GPIO header information ((R), (T), (V), (X)) transmitted from the controller 201, converting the sampled GPIO signal into sampling data (Y) by (3) encoding in the designated GPIO mode (T), adding the GPIO header information ((R), (T), (V), (X)) and the time information and time stamp information t_stamp (S) transmitted from the controller 201 to the sampling data (Y) for encapsulation, attaching the CRC (Q) thereto, and transmitting the packet (4) to the LINK 220.

The de-encapsulator 260 de-encapsulates the input signal (5) from the LINK 220 by the GPIO header information ((R), (T), (V)) transmitted from the controller 201, (6) extracts the sampling data (Y), (8) restores the original GPIO signal from the packet of the sampling data (Y), and writes the restored GPIO signal to the memory 63. Further, the de-encapsulator 260 has a function of (9) reading the data written to the memory 63 after the time information input from the timer 202 and the time information immediately after the time stamp information t_stamp (S) coincide with each other and (10) transmitting the read data to the Slave 20, a function of performing, in the case where the setting information (U) of the pin connected to the input/output buffers 203 and 204 is included after the de-encapsulation (6), setting of the input/output buffers 203 and 204 in accordance with the content thereof, and a function of transmitting, in the case where new GPIO header information ((R), (T), (V)) is included after the de-encapsulation (6), the new GPIO header information to the controller 201.

(GPIO Control of De-Encapsulator 260 in S_SerDes 200)

The de-encapsulator 260 de-encapsulates the packet (5) from the LINK 220 by the GPIO header information ((T) to (X), or (R), (T), (V)) transmitted from the controller 201, (6) extracts the sampling data (Y), (8) restores the original GPIO signal from the packet of the sampling data (Y), and writes the restored GPIO signal to the memory 63.

FIG. 19 is a diagram showing a data structure of a packet input to the de-encapsulator 260. The de-encapsulator 260 has a function of (9) reading, in the case where the time information input from the timer 202 and the time information immediately after the time stamp information t_stamp (S) coincide with each other, the data written to the memory 63 and (10) transmitting the read data to the Slave 20. Further, the de-encapsulator 260 has a function of performing, in the case where the setting information (U) of the pin connected to the input/output buffers 203 and 204 is included after the de-encapsulation (6), setting of the input/output buffers 203 and 204 in accordance with the content thereof, and a function of transmitting, in the case where new GPIO header information ((T) to (X), or (R), (T), (V)) is included after the de-encapsulation (6), the new GPIO header information to the controller 201.

The de-encapsulator 260 de-encapsulates the packet (5), checks, in the case where the setting information (U) or (R) of the pin connected to the input/output buffers 203 and 204 is included therein, the setting information (U) or (R) of the corresponding pin, and performs GPIO setting.

For example, the setting information (U) or (R) of the input/output buffer 203 is IN, GPIO setting in which the output from the Slave 20 is input as GPIO is performed. In the case where the setting information (U) or (R) of the input/output buffer 204 is OUT, GPIO setting in which an input signal to the Slave 20 is output as GPIO. In the case where pull Up or pull Down is performed outside the input/output buffers 203 and 204, the GPIO setting information (U) or (R) is IN_float (pullup/pulldown).

Note that setting of the input/output buffers 103 and 104 can be performed similarly also in the controller 101 in the M_SerDes 100.

(System Time Synchronization 1/2)

Figure 20:
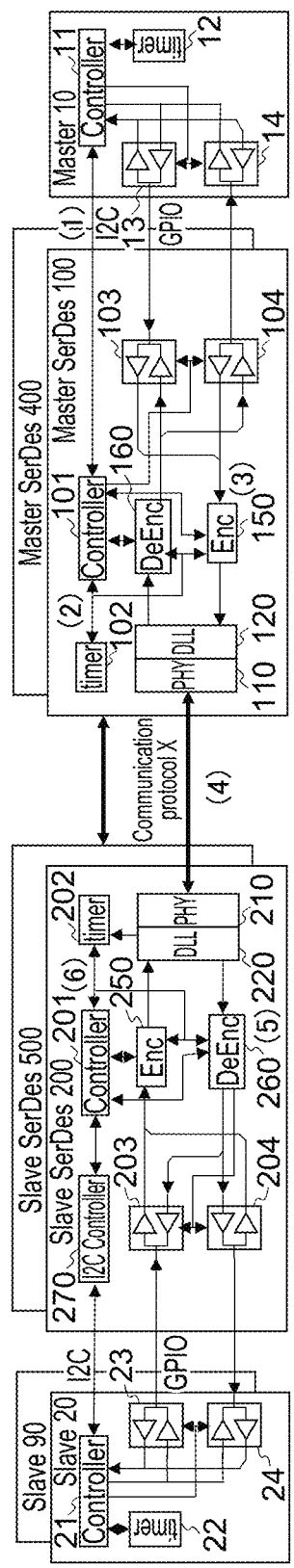
FIG. 20 is a diagram showing procedures (1) to (6) for time-synchronizing the timer in the Master, the timer in the M_SerDes and the timer in the S_SerDes with each other.

FIG. 20 is a diagram showing procedures (1) to (6) for time-synchronizing the timer 12 in the Master 10, the timer 102 in the M_SerDes 100, and the timer 202 in the S_SerDes 200 with each other.

(1) The Master 10 transmits a time control command for time-synchronizing the timer 12 of the Master 10 and the timer 102 of the M_SerDes 100 with each other to the controller 101 through I2C.

(2) The M_SerDes 100 performs, in response to a reception command, setting of the timer 102 such that the time of the timer 102 is the same as that of the timer 12 of the Master 10.

(3) The Master 10 encapsulates the time control command for time-synchronizing the timer 12 of the Master 10 and the timer 202 of the S_SerDes 200 with each other by the encapsulator 150 of the M_SerDes 100 in the format of the protocol X.

(4) The time control command encapsulated in the format of the protocol X is transmitted to the S_SerDes 200.

(5) The encapsulated time control command is de-encapsulated by the de-encapsulator 260 of the S_SerDes 200 to restore the time control command, and the restored time control command is transmitted to the controller 201 of the S_SerDes 200.

(6) The controller 201 performs, in response to a reception command, setting of the timer 202 such that the time of the timer 202 is the same as that of the timer 12 of the Master 10. In this way, the respective timers (12,102,202) can be time-synchronized with each other.

(System Time Synchronization 2/2)

Figure 21:
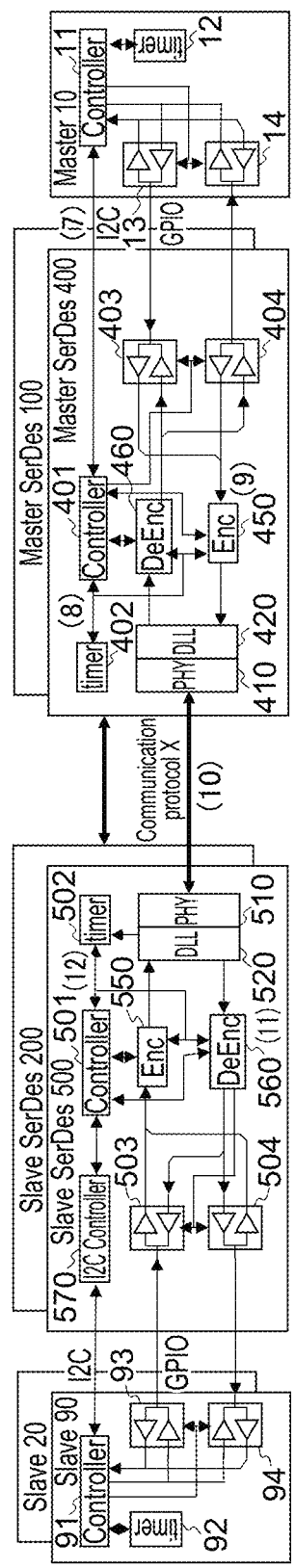
FIG. 21 is a diagram showing procedures (7) to (12) for time-synchronizing the timer in the Master, the timer in the M_SerDes and the timer in the S_SerDes with each other.

FIG. 21 is a diagram showing procedures (7) to (12) for time-synchronizing the timer 12 in the Master 10, the timers 102 and 402 in the M_SerDeses 100 and 400, and the timers 202 and 502 in the S_SerDeses 200 and 500 with each other.

(7) The Master 10 transmits, to the controllers 101 and 401, the time control command for time-synchronizing the timer 12 of the Master 10 and the timers 102 and 402 of the M_SerDeses 100 and 400 with each other.

(8) The M_SerDeses 100 and 400 perform, in response to a reception command, setting of the timers 102 and 402 such that the times of the timers 102 and 402 are the same as that of the timer 12 of the Master 10.

(9) The Master 10 encapsulates the time control command for time-synchronizing the timer 12 of the Master 10 and the timers 202 and 502 of the S_SerDeses 200 and 500 with each other by the encapsulators 150 and 450 of the M_SerDeses 100 and 400 in the format of the protocol X.

(10) The time control command encapsulated in the format of the protocol X is transmitted to the S_SerDeses 200 and 500.

(11) The encapsulated time control command is de-encapsulated by the de-encapsulators 160 and 560 of the S_SerDeses 200 and 500 to restore the time control command, and the restored time control command is transmitted to the controllers 201 and 501 of the S_SerDeses 200 and 500.

(12) The controllers 201 and 501 perform, in response to a reception command, setting of the timer 502 such that the time of the timer 502 is the same as that of the timer 12 of the Master 10.

In this way, the timers 12, 402, and 502 can be time-synchronized with each other. Therefore, since the timers 12, 102, 202, 402, and 502 are time-synchronized with each other, the time-synchronization of the entire system can be performed and a command execution start time from the Master 10 can be synchronized by a plurality of devices in the system.

Effect of this Embodiment

The M_SerDes 100 and the S_SerDes 200 according to this embodiment are capable of sampling the GPIO signal from the Master 10 or the Slave 20 by one of full sampling and edge sampling as necessary. For example, in the case where the toggle rate of the GPIO signal is high, it is possible to prevent the GPIO signal from being missed by selecting the full sampling. Further, in the case where the toggle rate of the GPIO signal is low, it is possible to acquire only information of the starting point and the logical change point of the GPIO signal, reduce the amount of data, and efficiently transmit data by selecting edge sampling.

While the M_SerDes 100 according to this embodiment performs GPIO communication with the Master 10 and the S_SerDes 200 performs GPIO communication with the Slave 20, serial signal transmission can be performed between the M_SerDes 100 and the S_SerDes 200 through the predetermined communication protocol X. The predetermined communication protocol X is, for example, a TDD method of a half-duplex communication system and the GPIO communication is of a full-duplex communication system. In this regard, the M_SerDes 100 and the S_SerDes 200 are capable of performing high-speed serial communication by converting a signal of the full-duplex communication system into a packet of a half-duplex communication system.

Further, the M_SerDes 100 is capable of generating, on the basis of the GPIO setting information transmitted from the Master 10 by a communication method different from the GPIO communication, a packet to be transmitted to the S_SerDes 200 before starting communication with the S_SerDes 200. Since this GPIO setting information is included in the GPIO header information of the packet, the S_SerDes 200 is capable of easily acquiring the GPIO setting information. Therefore, the S_SerDes 200 is capable of extracting, on the basis of the GPIO setting information from the Master 10, the GPIO signal from the packet, and converting the GPIO signal from the Slave 20 into a packet.

Note that the present technology may also take the following configurations.

(1) A communication apparatus, including:

a controller that determines a time stamp as a starting point and a unit period of the time stamp starting from the starting point;

an encapsulator that synchronizes, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information;

a LINK that generates an Up link packet including the first GPIO packet; and a PHY that transmits a transmission signal to a communication partner apparatus, the transmission signal conforming to a predetermined communication protocol and including the Up link packet.

(2) The communication apparatus according to (1), in which the controller receives, from the Master, GPIO setting information including sampling-mode information for specifying one of a first mode and a second mode, a time stamp, and a sampling period, and the encapsulator generates, in the first mode, the first GPIO packet including all pieces of sampling data obtained by sampling a first GPIO signal received from the Master in the sampling period starting from the starting point, and generates, in the second mode, where a value of the sampling data sampled at first sampling timing differs from a value of the sampling data sampled at second sampling timing the sampling period after the first sampling timing, the first GPIO packet including the sampling data sampled at the second sampling timing and first time information indicating the second sampling timing.

(3) The communication apparatus according to (2), further including a de-encapsulator that reproduces a second GPIO signal and transmits the second GPIO signal to the Master, in which the PHY receives a transmission signal conforming to the predetermined communication protocol from the communication partner apparatus, the LINK separates a second GPIO packet from the transmission signal, and the de-encapsulator reproduces the second GPIO signal on a basis of the sampling-mode information, the starting point, the sampling period, and the second GPIO packet, reproduces, in the first mode in which one or more pieces of sampling data is included in the second GPIO packet, the second GPIO signal by assigning each of the one or more pieces of sampling data included in the second GPIO packet to respective pieces of sampling data sampled every time the sampling period elapses starting from the starting point, and reproduces, in the second mode in which each of one or more pieces of sampling data is included in the second GPIO packet in association with second time information indicating sampling timing, the second GPIO signal by repeating processing of assigning the sampling data corresponding to the second time information at the sampling timing indicated by the second time information and assigning the same sampling data for each sampling period until the sampling timing corresponding to the next second time information in the second GPIO packet.

(4) The communication apparatus according to (2) or (3), further including a second timer that outputs time information synchronized with a first timer in the Master, the de-encapsulator includes a memory for storing the second GPIO signal, the second GPIO packet includes time stamp information relating to output timing of the second GPIO signal, and the de-encapsulator transmits, where the time stamp information has a first value, the second GPIO signal to the Master without storing the second GPIO signal in the memory, stores, where the time stamp information has a second value, the second GPIO signal in the memory, and reads, where time information of the second timer coincides with time information inserted after the time stamp information in the second GPIO packet, the second GPIO signal from the memory and transmits the read second GPIO signal to the Master.

(5) The communication apparatus according to any one of (2) to (4), in which the controller performs, before starting GPIO communication with the Master, control of the encapsulator to generate the packet on a basis of the GPIO setting information transmitted from the Master by a communication method different from GPIO communication.

(6) The communication apparatus according to (5), in which the GPIO setting information includes at least one of sampling frequency information of the GPIO signal, GPIO pin setting information, GPIO configuration information, or data length information of the sampled data.

(7) The communication apparatus according to (6), in which the encapsulator generates the first GPIO packet that includes header information including at least one of the sampling-mode information, the sampling frequency information, the GPIO pin setting information, the GPIO configuration information, or the data length information.

(8) The communication apparatus according to (7), in which the GPIO configuration information includes the number of pins for performing GPIO communication, the GPIO pin setting information, and a time slot for storing GPIO communication information.

(9) The communication apparatus according to (7) or (8), in which the encapsulator generates, before transmitting a packet including the sampled data to the communication partner apparatus, the first GPIO packet including the header information without including the sampled data.

(10) The communication apparatus according to any one of (7) to (9), in which the encapsulator generates at least one of the first GPIO packet including the header information without including the sampled data, the first GPIO packet including the header information and the sampled data, or the first GPIO packet including the sampled data without including the header information.

(11) The communication apparatus according to (10), in which the encapsulator adds at least one of time stamp information or error detection information to the first GPIO packet.

(12) The communication apparatus according to any one of (1) to (11), in which the communication protocol is a communication protocol of a TDD (Time Division Duplex) communication method, and the unit period is one frame period of the TDD communication method.

(13) A communication apparatus, including:

a PHY that receives, from a communication partner apparatus, a transmission signal conforming to a predetermined communication protocol;

a LINK that separates a first GPIO packet including a time control command from the transmission signal;

a controller that determines a starting point on a basis of the time control command; and a de-encapsulator that determines whether sampling-mode information included in header information in the first GPIO packet is a first mode indicating to include all pieces of sampling data obtained by sampling a GPIO (General Purpose Input/Output) signal transmitted from a Master at a constant sampling period or a second mode indicating to include sampling data sampled at a sampling interval corresponding to a frequency of logical changes of the GPIO signal and sampling position information, converts the first GPIO packet into a first GPIO signal, and transmits the obtained first GPIO signal to a Slave.

(14) The communication apparatus according to (13), in which the de-encapsulator reproduces, in the first mode in which one or more pieces of sampling data is included in the first GPIO packet, the first GPIO signal by assigning each of the one or more pieces of sampling data included in the first GPIO packet to respective pieces of sampling data sampled every time the sampling period elapses starting from the starting point, and reproduces, in the second mode in which each of one or more pieces of sampling data is included in the first GPIO packet in association with first time information indicating sampling timing, the first GPIO signal by repeating processing of assigning the sampling data corresponding to the first time information at the sampling timing indicated by the first time information and assigning the same sampling data for each sampling period until the sampling timing corresponding to the next first time information in the first GPIO packet.

(15) The communication apparatus according to (13) or (14), further including a second timer that outputs time information synchronized with a first timer in the Master, in which the de-encapsulator includes a memory for storing the first GPIO signal, the first GPIO packet includes time stamp information relating to output timing of the first GPIO signal, and the de-encapsulator transmits, where the time stamp information has a first value, the first GPIO signal to the slave without storing the first GPIO signal in the memory, stores, where the time stamp information has a second value, the first GPIO signal in the memory, and reads, where time information of the second timer coincides with time information inserted after the time stamp information in the first GPIO packet, the first GPIO signal from the memory and transmits the read first GPIO signal to the Slave.

(16) The communication apparatus according to any one of (13) to (15), further including an encapsulator that generates, starting from a starting point, a second GPIO packet including sampling data obtained by sampling a second GPIO signal from the Slave at one of a constant sampling period and a sampling interval corresponding to a frequency of logical changes of the GPIO signal, and sampling position information.

(17) The communication apparatus according to (16), in which the encapsulator generates, in the first mode, the second GPIO packet including all pieces of sampling data obtained by sampling the second GPIO signal received from the Slave in the sampling period starting from the starting point, and generates, in the second mode, where a value of the sampling data sampled at first sampling timing differs from a value of the sampling data sampled at second sampling timing the sampling period after the first sampling timing, the second GPIO packet including the sampling data sampled at the second sampling timing and time information indicating the second sampling timing.

(18) The communication apparatus according to any one of (13) to (17), in which the controller performs input/output control of a GPIO pin on a basis of GPIO pin setting information transmitted from the Master via the communication partner apparatus before starting GPIO communication with the Slave.

(19) The communication apparatus according to any one of (13) to (18), in which the header information includes at least one of sampling frequency information, GPIO pin setting information, GPIO configuration information, or data length information of the sampled data.

(20) The communication apparatus according to any one of (13) to (19), in which the communication protocol is a communication protocol of a TDD (Time Division Duplex) communication method.

(21) A communications system, including:

a Master SerDes and a Slave SerDes that perform serial communication through a predetermined communication protocol, in which the Master SerDes includes a first controller that determines a time stamp as a starting point and a unit period of the time stamp starting from the starting point, a first encapsulator that synchronizes, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information, a first LINK that generates an Up link packet including the first GPIO packet, and a first PHY that transmits a transmission signal to a communication partner apparatus, the transmission signal conforming to the predetermined communication protocol and including the Up link packet, and the Slave SerDes includes a second PHY that receives, from a communication partner apparatus, a transmission signal conforming to the predetermined communication protocol, a second LINK that separates a second GPIO packet including a time control command from the transmission signal, a second controller that determines a starting point on a basis of the time control command, and a first de-encapsulator that determines whether sampling-mode information included in header information in the second GPIO packet is a first mode indicating to include all pieces of sampling data obtained by sampling a second GPIO signal transmitted from a Master at a constant sampling period or a second mode indicating to include sampling data sampled at a sampling interval corresponding to a frequency of logical changes of the GPIO signal and sampling position information, converts the second GPIO packet into a second GPIO signal, and transmits the obtained second GPIO signal to a Slave.

(22) A communications method in which a Master SerDes and a Slave SerDes perform serial communication through a predetermined communication protocol, including:

by the Master SerDes, determining a time stamp as a starting point and a unit period of the time stamp starting from the starting point;

synchronizing, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information;

generating an Up link packet including the first GPIO packet; and transmitting a transmission signal to a communication partner apparatus, the transmission signal conforming to the predetermined communication protocol and including the Up link packet; and by the Slave SerDes, receiving, from a communication partner apparatus, a transmission signal conforming to the predetermined communication protocol;

separating a second GPIO packet including a time control command from the transmission signal;

determining a starting point on a basis of the time control command; and determining whether sampling-mode information included in header information in the second GPIO packet is a first mode indicating to include all pieces of sampling data obtained by sampling a second GPIO signal transmitted from a Master at a constant sampling period or a second mode indicating to include sampling data sampled at a sampling interval corresponding to a frequency of logical changes of the GPIO signal and sampling position information, converts the second GPIO packet into a second GPIO signal, and transmitting the obtained second GPIO signal to a Slave.

The embodiments of the present disclosure are not limited to the individual embodiments described above, and includes various modifications conceived by those skilled in the art. Also the effects of the present disclosure are not limited the content described above.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus, comprising:
   at least one processor configured to execute instructions to provide:
   a controller that determines a time stamp as a starting point and a unit period of the time stamp starting from the starting point;
   an encapsulator that synchronizes, starting from the starting point, a General Purpose Input/Output (GPIO) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information;
   a Link Layer (LINK) that generates an Up link packet including the first GPIO packet; and
   a Physical Layer (PHY) that transmits a transmission signal to a communication partner apparatus, the transmission signal conforming to a predetermined communication protocol and including the Up link packet.

2. The communication apparatus according to claim 1, wherein
   the controller receives, from the Master, GPIO setting information including sampling-mode information for specifying one of a first mode and a second mode, a time stamp, and a sampling period, and
   the encapsulator
   generates, in the first mode, the first GPIO packet including all pieces of sampling data obtained by sampling a first GPIO signal received from the Master in the sampling period starting from the starting point, and
   generates, in the second mode, where a value of the sampling data sampled at first sampling timing differs from a value of the sampling data sampled at second sampling timing the sampling period after the first sampling timing, the first GPIO packet including the sampling data sampled at the second sampling timing and first time information indicating the second sampling timing.

3. The communication apparatus according to claim 2, further comprising
   a de-encapsulator that reproduces a second GPIO signal and transmits the second GPIO signal to the Master, wherein
   the PHY receives a transmission signal conforming to the predetermined communication protocol from the communication partner apparatus,
   the LINK separates a second GPIO packet from the transmission signal, and
   the de-encapsulator
   reproduces the second GPIO signal on a basis of the sampling-mode information, the starting point, the sampling period, and the second GPIO packet,
   reproduces, in the first mode in which one or more pieces of sampling data is included in the second GPIO packet, the second GPIO signal by assigning each of the one or more pieces of sampling data included in the second GPIO packet to respective pieces of sampling data sampled every time the sampling period elapses starting from the starting point, and
   reproduces, in the second mode in which each of one or more pieces of sampling data is included in the second GPIO packet in association with second time information indicating sampling timing, the second GPIO signal by repeating processing of assigning the sampling data corresponding to the second time information at the sampling timing indicated by the second time information and assigning the same sampling data for each sampling period until the sampling timing corresponding to the next second time information in the second GPIO packet.

4. The communication apparatus according to claim 3, further comprising
   a second timer that outputs time information synchronized with a first timer in the Master,
   the de-encapsulator includes a memory for storing the second GPIO signal,
   the second GPIO packet includes time stamp information relating to output timing of the second GPIO signal, and
   the de-encapsulator
   transmits, where the time stamp information has a first value, the second GPIO signal to the Master without storing the second GPIO signal in the memory,
   stores, where the time stamp information has a second value, the second GPIO signal in the memory, and
   reads, where time information of the second timer coincides with time information inserted after the time stamp information in the second GPIO packet, the second GPIO signal from the memory and transmits the read second GPIO signal to the Master.

5. The communication apparatus according to claim 2, wherein
the controller performs, before starting GPIO communication with the Master, control of the encapsulator to generate the packet on a basis of the GPIO setting information transmitted from the Master by a communication method different from GPIO communication.

6. The communication apparatus according to claim 5, wherein
the GPIO setting information includes at least one of sampling frequency information of the GPIO signal, GPIO pin setting information, GPIO configuration information, or data length information of the sampled data.

7. The communication apparatus according to claim 6, wherein
the encapsulator generates the first GPIO packet that includes header information including at least one of the sampling-mode information, the sampling frequency information, the GPIO pin setting information, the GPIO configuration information, or the data length information.

8. The communication apparatus according to claim 7, wherein
the GPIO configuration information includes the number of pins for performing GPIO communication, the GPIO pin setting information, and a time slot for storing GPIO communication information.

9. The communication apparatus according to claim 7, wherein
the encapsulator generates, before transmitting a packet including the sampled data to the communication partner apparatus, the first GPIO packet including the header information without including the sampled data.

10. The communication apparatus according to claim 7, wherein
the encapsulator generates at least one of the first GPIO packet including the header information without including the sampled data, the first GPIO packet including the header information and the sampled data, or the first GPIO packet including the sampled data without including the header information.

11. The communication apparatus according to claim 10, wherein
the encapsulator adds at least one of time stamp information or error detection information to the first GPIO packet.

12. The communication apparatus according to claim 1, wherein
the communication protocol is a communication protocol of a TDD (Time Division Duplex) communication method, and
the unit period is one frame period of the TDD communication method.

13. A communication apparatus, comprising:
at least one processor configured to execute instructions to provide:
a Physical Layer (PHY) that receives, from a communication partner apparatus, a transmission signal conforming to a predetermined communication protocol;
a Link Layer (LINK) that separates a first General Purpose Input/Output (GPIO) packet including a time control command from the transmission signal;
a controller that determines a starting point on a basis of the time control command; and
a de-encapsulator that determines whether sampling-mode information included in header information in the first GPIO packet is a first mode indicating to include all pieces of sampling data obtained by sampling a GPIO signal transmitted from a Master at a constant sampling period or a second mode indicating to include sampling data sampled at a sampling interval corresponding to a frequency of logical changes of the GPIO signal and sampling position information, converts the first GPIO packet into a first GPIO signal, and transmits the obtained first GPIO signal to a Slave.

14. The communication apparatus according to claim 13, wherein
the de-encapsulator
reproduces, in the first mode in which one or more pieces of sampling data is included in the first GPIO packet, the first GPIO signal by assigning each of the one or more pieces of sampling data included in the first GPIO packet to respective pieces of sampling data sampled every time the sampling period elapses starting from the starting point, and
reproduces, in the second mode in which each of one or more pieces of sampling data is included in the first GPIO packet in association with first time information indicating sampling timing, the first GPIO signal by repeating processing of assigning the sampling data corresponding to the first time information at the sampling timing indicated by the first time information and assigning the same sampling data for each sampling period until the sampling timing corresponding to the next first time information in the first GPIO packet.

15. The communication apparatus according to claim 13, further comprising
a second timer that outputs time information synchronized with a first timer in the Master, wherein
the de-encapsulator includes a memory for storing the first GPIO signal,
the first GPIO packet includes time stamp information relating to output timing of the first GPIO signal, and
the de-encapsulator
transmits, where the time stamp information has a first value, the first GPIO signal to the slave without storing the first GPIO signal in the memory,
stores, where the time stamp information has a second value, the first GPIO signal in the memory, and
reads, where time information of the second timer coincides with time information inserted after the time stamp information in the first GPIO packet, the first GPIO signal from the memory and transmits the read first GPIO signal to the Slave.

16. The communication apparatus according to claim 13, further comprising
an encapsulator that generates, starting from a starting point, a second GPIO packet including sampling data obtained by sampling a second GPIO signal from the Slave at one of a constant sampling period and a sampling interval corresponding to a frequency of logical changes of the GPIO signal, and sampling position information.

17. The communication apparatus according to claim 16, wherein
the encapsulator
generates, in the first mode, the second GPIO packet including all pieces of sampling data obtained by sampling the second GPIO signal received from the Slave in the sampling period starting from the starting point, and generates, in the second mode, where a value of the sampling data sampled at first sampling timing differs from a value of the sampling data sampled at second sampling timing the sampling period after the first sampling timing, the second GPIO packet including the sampling data sampled at the second sampling timing and time information indicating the second sampling timing.

18. The communication apparatus according to claim 13, wherein
the controller performs input/output control of a GPIO pin on a basis of GPIO pin setting information transmitted from the Master via the communication partner apparatus before starting GPIO communication with the Slave.

19. The communication apparatus according to claim 13, wherein
the header information includes at least one of sampling frequency information, GPIO pin setting information, GPIO configuration information, or data length information of the sampled data.

20. The communication apparatus according to claim 13, wherein
the communication protocol is a communication protocol of a TDD (Time Division Duplex) communication method.

21. A communications system, comprising:
a Master SerDes and a Slave SerDes that perform serial communication through a predetermined communication protocol, wherein
the Master SerDes includes
a first processor configured to execute instructions to provide
a first controller that determines a time stamp as a starting point and a unit period of the time stamp starting from the starting point,
a first encapsulator that synchronizes, starting from the starting point, a General Purpose Input/Output (GPIO) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information,
a first Link Layer (LINK) that generates an Up link packet including the first GPIO packet, and
a first Physical Layer (PHY) that transmits a transmission signal to a communication partner apparatus, the transmission signal conforming to the predetermined communication protocol and including the Up link packet, and
the Slave SerDes includes
a second processor configured to execute instructions to provide
a second PHY that receives, from a communication partner apparatus, a transmission signal conforming to the predetermined communication protocol,
a second LINK that separates a second GPIO packet including a time control command from the transmission signal,
a second controller that determines a starting point on a basis of the time control command, and
a first de-encapsulator that determines whether sampling-mode information included in header information in the second GPIO packet is a first mode indicating to include all pieces of sampling data obtained by sampling a second GPIO signal transmitted from a Master at a constant sampling period or a second mode indicating to include sampling data sampled at a sampling interval corresponding to a frequency of logical changes of the GPIO signal and sampling position information, converts the second GPIO packet into a second GPIO signal, and transmits the obtained second GPIO signal to a Slave.

22. A communications method in which a Master SerDes and a Slave SerDes perform serial communication through a predetermined communication protocol, comprising:
by the Master SerDes,
determining a time stamp as a starting point and a unit period of the time stamp starting from the starting point;
synchronizing, starting from the starting point, a GPIO (General Purpose Input/Output) signal from a Master with the time stamp to generate one of a first GPIO packet including all pieces of sampling data sampled at a constant sampling period and a first GPIO packet including sampling data sampled at a sampling interval according to a frequency of logical changes of the GPIO signal and sampling position information;
generating an Up link packet including the first GPIO packet; and
transmitting a transmission signal to a communication partner apparatus, the transmission signal conforming to the predetermined communication protocol and including the Up link packet; and
by the Slave SerDes,
receiving, from a communication partner apparatus, a transmission signal conforming to the predetermined communication protocol;
separating a second GPIO packet including a time control command from the transmission signal;
determining a starting point on a basis of the time control command; and
determining whether sampling-mode information included in header information in the second GPIO packet is a first mode indicating to include all pieces of sampling data obtained by sampling a second GPIO signal transmitted from a Master at a constant sampling period or a second mode indicating to include sampling data sampled at a sampling interval corresponding to a frequency of logical changes of the GPIO signal and sampling position information, converts the second GPIO packet into a second GPIO signal, and transmitting the obtained second GPIO signal to a Slave.

* * * * *